(12) United States Patent
Beebe et al.

(10) Patent No.: US 12,165,645 B1
(45) Date of Patent: Dec. 10, 2024

(54) STYLIZED TEXT TRANSCRIPTION FOR MESSAGING

(71) Applicant: Amazon Technologies, Inc., Seattle, WA (US)

(72) Inventors: Blair Harold Beebe, Menlo Park, CA (US); Peter Chin, Bellevue, WA (US); Maksim Surguy, Federal Way, WA (US); Chris Aaron Edmonds, Seattle, WA (US); Christina Siegfried, Fort Worth, TX (US); Kwan Ting Lee, Bellevue, WA (US); Darvin Vida, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 16/886,426

(22) Filed: May 28, 2020

(51) Int. Cl.
| | | |
|---|---|---|
| *G10L 15/26* | (2006.01) | |
| *G06F 40/284* | (2020.01) | |
| *G06F 40/289* | (2020.01) | |
| *G10L 15/16* | (2006.01) | |
| *G10L 25/63* | (2013.01) | |

(52) U.S. Cl.
CPC ............ *G10L 15/26* (2013.01); *G06F 40/284* (2020.01); *G06F 40/289* (2020.01); *G10L 15/16* (2013.01); *G10L 25/63* (2013.01)

(58) Field of Classification Search
CPC ......... G10L 15/16; G10L 15/26; G10L 25/63; G06F 40/289
See application file for complete search history.

(56) References Cited

U.S. PATENT DOCUMENTS

| | | | | |
|---|---|---|---|---|
| 9,043,196 | B1* | 5/2015 | Leydon | G06F 40/289 |
| | | | | 704/4 |
| 10,074,381 | B1* | 9/2018 | Cowburn | G06F 40/58 |
| 11,017,778 | B1* | 5/2021 | Thomson | H04M 3/42382 |
| 11,205,444 | B2* | 12/2021 | Bui | G06F 17/16 |
| 2003/0110450 | A1* | 6/2003 | Sakai | G06F 40/109 |
| | | | | 715/256 |
| 2006/0132812 | A1* | 6/2006 | Barnes | G06F 40/166 |
| | | | | 358/1.11 |
| 2012/0117082 | A1* | 5/2012 | Koperda | G06F 16/24578 |
| | | | | 707/E17.084 |
| 2014/0236596 | A1* | 8/2014 | Martinez | G10L 15/26 |
| | | | | 704/235 |
| 2018/0039621 | A1* | 2/2018 | Scronce | G06F 3/04817 |
| 2018/0077095 | A1* | 3/2018 | Deyle | G06T 13/205 |

(Continued)

FOREIGN PATENT DOCUMENTS

WO  WO-2018177134 A1 * 10/2018 ............ G06F 17/211

*Primary Examiner* — Paras D Shah
(74) *Attorney, Agent, or Firm* — Eversheds Sutherland (US) LLP

(57) ABSTRACT

Systems, methods, and computer-readable media are disclosed for annotating content data such as video data with annotation data (e.g., images, emoji, memes, stylized text, sounds) in near real time. Example methods may include determining transcribed text from the content data, associating annotation data with the transcribed text, and annotating the content data with some or all transcribed text and annotation data. Example methods may further include editing the annotated content data to generate modified annotated content data and sending the annotated content data and/or modified annotated content data to a device.

18 Claims, 12 Drawing Sheets

(56) References Cited

U.S. PATENT DOCUMENTS

| | | | |
|---|---|---|---|
| 2019/0182193 A1* | 6/2019 | Moskowitz | H04L 51/18 |
| 2019/0325867 A1* | 10/2019 | Bromand | G10L 15/22 |
| 2019/0373336 A1* | 12/2019 | Kim | G10L 25/63 |
| 2021/0142820 A1* | 5/2021 | Raikar | G06F 40/30 |
| 2021/0193110 A1* | 6/2021 | Park | G06F 40/279 |
| 2021/0271801 A1* | 9/2021 | Bruno | H04L 51/046 |
| 2021/0279264 A1* | 9/2021 | Robert Jose | G06F 16/3347 |
| 2022/0066623 A1* | 3/2022 | Tung | G06F 3/04895 |

* cited by examiner

STYLIZED TEXT TRANSCRIPTION FOR MESSAGING

BACKGROUND

Electronic devices, such as smartphones, tablets, smartwatches, smart-sensors and the like, may generate various types of video, audio, and other content data and may send the data in a message or email to other devices. These devices may also generate text messages that may include image data such as emojis, memes, animations, and other audio and visual data.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

The systems and methods herein may be used to annotate and otherwise modify media content data such as image data, video data, and/or audio data in near real-time. Electronic devices such as smart phones, tablets, personal computers, and the like may generate, receive, or otherwise obtain various types of content data (e.g., video data, audio data, etc.). The electronic device may transcribe text associated with the content data and/or may send the content data to another device (e.g., a server, such as that used for Amazon Transcribe and/or Amazon Lex) to generate text or other meaningful representations of information associated with the content data. The electronic device may maintain a library of phrases that are associated with certain annotation data (e.g., images, emoji, animations, memes, GIFs, stylized text, sounds, etc.). The electronic device may incorporate some or all of the generated information into the media content. For example, the transcribed text may appear to be overlaid over video or other graphical content.

In some examples, the selection of the annotation data may be guided by the semantics engine. The semantics engine may be employed to determine a sentiment indication based on the media content. The sentiment indication may be indicative of an emotion (happy, sad, angry, sarcastic, etc.) or sentiment (positive, negative, neutral, etc.) associated with content data. Depending on the sentiment indication, certain annotation data identified in the library of phrases may be disregarded or selected. Further, the size, presentation location, style, color, or presentation duration of the annotation data may be automatically adjusted and/or selected based on the sentiment indication. For example, if a phrase is emphasized, an image corresponding to that phrase may be enlarged. Alternatively, or in addition, default settings may be consulted to disregard or select certain annotation data identified in the library of phrases and/or determine the size, presentation location, style, color, or presentation duration of the annotation data. A user profile maintained by the preferences manager may include certain default settings and preferences associated with that user profile.

Input data may be received by the electronic device and the annotated content data may be further modified based on the input data. For example, additional images, emoji, animations, memes, GIFs, and/or stylized text may be added to the annotated content data. The annotated content data may be modified and further annotated in this manner in pieces and then combined in sequence or alternatively may be analyzed and annotated at the same time. The annotated content data may be sent to a second electronic device to be displayed on the second electronic device. The annotated content data may also, or alternatively, be sent to a server to be displayed in a media feed accessed by other electronic devices.

Figure 1A:
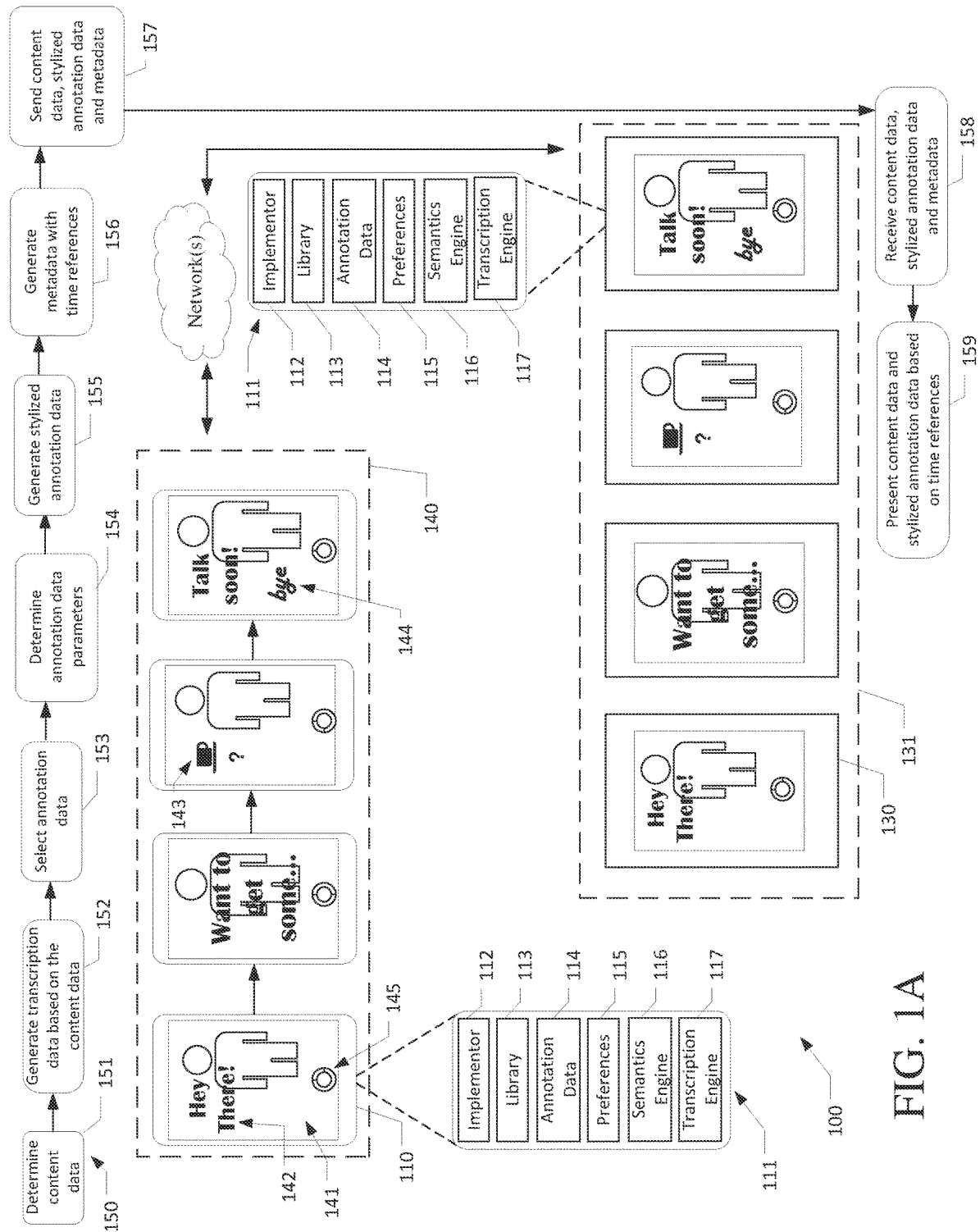
FIG. 1A is a schematic illustration of an example use case for generating stylized annotated data and metadata and sending the stylized annotated data and metadata in accordance with one or more example embodiments of the disclosure.

Referring to FIG. 1A, an example use case 100 for annotating content data in near real-time is depicted in accordance with one or more example embodiments of the disclosure. In the illustrated example, an electronic device 110 may generate or otherwise obtain content data, may generate stylized annotation data in near real-time and may communicate with electronic device 130 and optionally one or more servers. Electronic device 110 and/or electronic device 130 may be any electronic device that may communicate with each other and/or other electronic devices (e.g., servers) via any well-known wired or wireless system (e.g., Bluetooth, Bluetooth Low Energy (BLE), near field communication protocol, Wi-Fi, cellular network, etc.). Electronic device 110 and/or electronic device 130 may include a user input (e.g., touch screen, camera, buttons, microphone, keyboard, etc.) and may include a display (e.g., screen).

Electronic device 110 and/or 130 may be a computing device with a processor and may optionally include one or more sensors. In the example illustrated in FIG. 1, electronic device 110 and electronic device 130 are mobile devices (e.g., smartphone) with a camera, microphone, a speaker, and a touchscreen display. Electronic device 110 and electronic device 130 are described in greater detail below with respect to FIG. 6. It is understood that electronic device 130 may be the same as electronic device 110 or may be different. It is further understood that, while electronic device 110 and electronic device 130 are illustrated as mobile phones herein, electronic device 110 and/or electronic device 130 may be any other electronic device (e.g., tablet, e-reader, wearable device, connected device, desktop computer, laptop computer, one or more servers, or the like). As explained below with respect to FIG. 6, electronic device 110 may include memory designed to store computer-executable instructions and at least one computer processor designed to access memory and execute the computer-executable instructions.

Figure 1B:
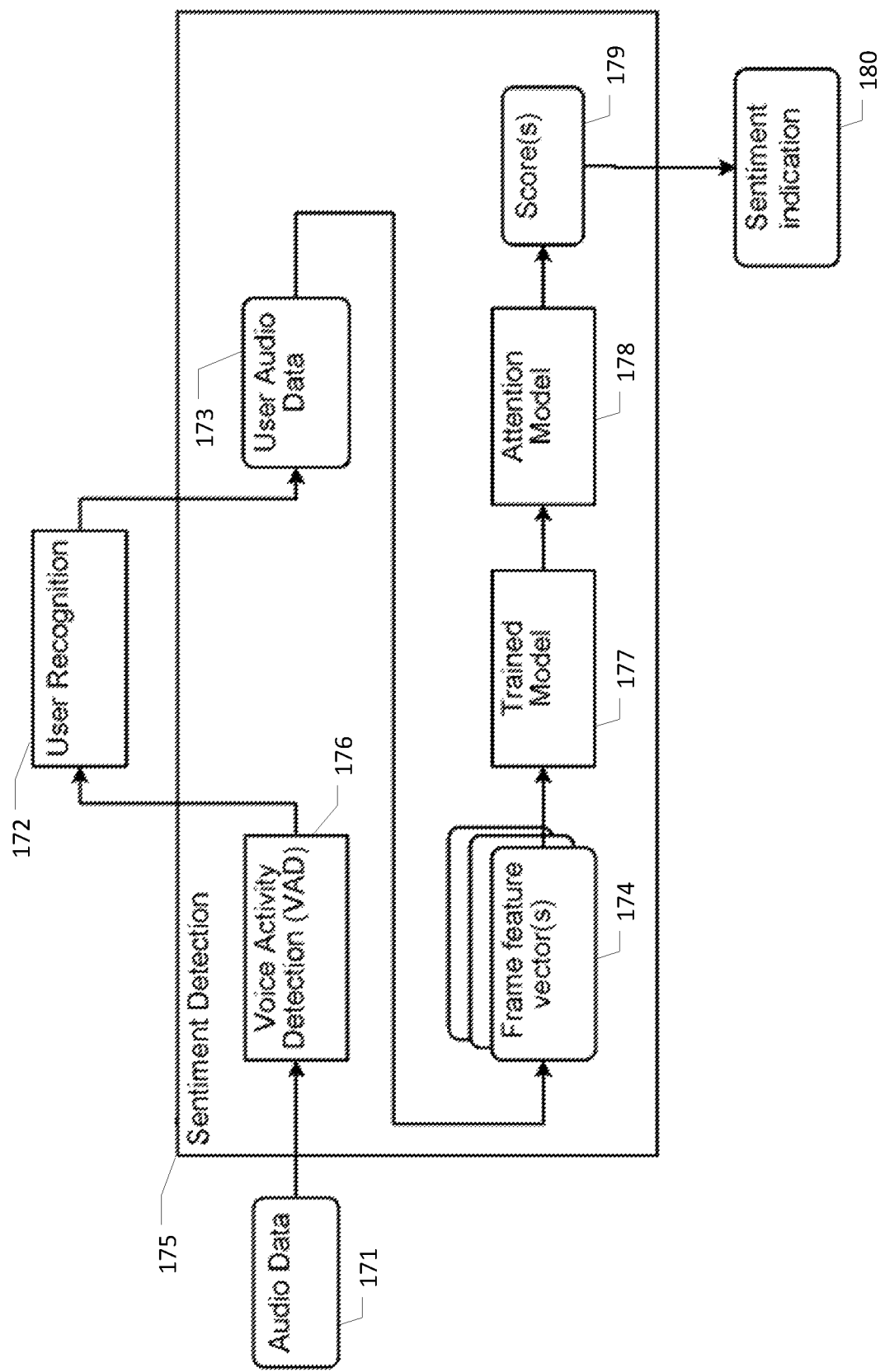
FIG. 1B is a schematic illustration of an example use case for determining a sentiment indication in accordance with one or more example embodiments of the disclosure.

As shown in FIG. 1A, electronic device 110 may run annotation application 111 which may include implementor 112 for implementation and overseeing annotation application 111, library 113 which may maintain one or more library of phrases (e.g., set of phrases) associated including several entries associated with one or more annotated data (e.g., image data, audio data, stylized text, GIFs, animates, photos, memes, emoji, sounds, and other content), annotation data 114 which may maintain a library of annotation data that is associated with the library of phrases, preferences 115 which may maintain user account preferences such as text font and color preferences and content data preferences (e.g., favorite emoji and stylized text), and/or semantics engine 116 which may determine a sentiment indication associated with the content data, described in more detail below with respect to FIG. 1B. The sentiment indication may be indicative of the emotion (happy, sad, angry, sarcastic, etc.) or sentiment (positive, negative, neutral, etc.) associated with content data. For example, the same word or phrase may have different meanings depending on whether it is said in a happy, angry, or sarcastic manner. Annotation application 111 may further include transcription engine 117 which may be any well-known text transcription and/or speech processing engine designed to receive audio and/or content data as an input and determine transcription data, such as transcribed text, associated with the audio and/or content data. The transcription data may be text or may be a numerical or other computer representation. The transcription data may correspond to one or more time points associated with the audio and/or content data. In one example, the transcription engine 117 may employ automatic speech recognition (ASR) software. In another example, transcription engine 117 may employ natural-language understanding (NLU) and/or natural-language interpretation (NLI). It is understood that the annotation application 111 may include more components and/or that the components, such as implementation manager, may perform additional functions.

Screen shots 140 illustrate annotated content data displayed on electronic device 110. As is shown, content data 141 is illustrated behind annotation data 142, such that annotation data 142 is overlaid on content data 141. Annotation data 142 includes emoji 143 as well stylized text 144. Time indicator 145 may also be included and may indicate how much time is remaining in the annotated content data. Time indicator 145 may be a circle with a time marker to visually indicate how much time is left in the annotated video. Screen shots 131 illustrate the annotated content data displayed on electronic device 130. As explained below, electronic device 130 may also run annotation application 111.

To initiate the actions of annotating content data via the annotation platform, an example process flow 150 is presented and may be performed, for example, by one or more modules at electronic device 110 and/or electronic device 130. The electronic device 110 and/or electronic device 130 may include at least one memory that stores computer-executable instructions and at least one processor configured to access the at least one memory and execute the computer-executable instructions to perform various actions or operations, such as one or more of the operations in the process flow 150 of FIG. 1A.

At block 151, content data may be determined. This may involve a user using electronic device 110 recording video data, audio data, image data and/or any other audio/visual data on electronic device 110. For example, video data may include audio data and visual data that may be recorded and/or captured using a camera and a microphone on the electronic device 110. Alternatively, at block 151, the electronic device may obtain content data from one or more devices, such as a different electronic device or a server.

At block 152, the content data determined at block 151 may be analyzed by transcription engine 117 to determine transcription data based on the content data. In another example, the content data, or a portion thereof, may be sent to a different device (e.g., server) to determine transcription data. The content data and/or audio data may be processed by transcription engine 117 to determine text (e.g., words and phrases) associated with the content and/or audio data. The transcription engine 117 may associate the transcribed text with time points along the audio data. For example, the transcription engine may indicate that the text "coffee" occurred between 4.5 and 5.5 seconds. Electronic device 110 may, optionally, separate audio data from content data facilitate text transcription. As explained above, the transcription engine 117 may be any well-known software, instructions, and/or application for transcribing text from audio and/or media content data. Running transcription engine 117 on electronic device 110 may facilitate near-real time annotation of the content data, may preserve privacy and/or may otherwise improve the user experience.

At block 153, annotation data corresponding to the content data may be determined. To determine the annotation data, the transcription data may be analyzed by library 113 to determine whether any of the transcription data is associated with any content entries in library 113. As explained in greater detail below with respect to FIG. 2D, key phrases in the transcription data may be identified and matched with an entry in the library of phrases. The entry may include one or more types of annotation data corresponding to the key phrase. The implementor 112 may coordinate with preferences 115 and/or semantics engine 116 to determine which annotation data to retrieve. For example, if multiple entries are associated with a phrase, semantics engine 116 and/or preferences 115 may be used to select between the options. In one example, semantics engine 116 may determine that a user is angry and this information be employed to select between two different annotation data options corresponding to the key phrase. If multiple libraries of key phrases are available, semantics engine 116 and/or preferences 115 may also be used to determine which library to use. Preferences manager 115 may further inform implementor 112 of how much text to replace with content data and/or how much text to incorporate into the content data. For example, a user account may indicate that a user prefers to include all or a significant amount of text in the annotated text. The user account may also inform implementor 112 of how often to replace text with content data or even what type of text to replace with content data (e.g., food text, emotion text, action text, sounds, etc.).

At block 154, annotation data parameters may be determined. In one example, annotation parameters may include rendering size, presentation location, style, color, and/or presentation duration of the annotation data. For example, implementor 112 may determine a sentiment indication to adjust and/or select one or more annotation parameters. In one example, a user may emphasize the phrase "I Love You." The sentiment indication may indicate that this phrase was emphasized and that the user is happy and based on the sentiment indication, a heart emoji associated with this phrase may be enlarged and positioned in the center of the display. Alternatively, or in addition, preferences 115 may be consulted to determine that a user prefers the color purple. In one example, this information may be used to change the color of the heart associated with the phrase "I Love You" to purple.

At block 155 stylized annotation data may be generated. For example, the purple heart in the example above may be rendered and prepared to be overlaid over content data at a certain time reference. In one example, the stylized annotation data may include an image file of the purple heart at the determined location on the display, but not the content data itself. At block 156, metadata may be generated and may be indicative of information about time reference points in the transcription data associated with the stylized annotation data. For example, the purple heart emoji may be associated with time points 14-15 seconds. Metadata may inform a device of when to overlay the content data with the stylized annotation data.

Exemplary stylized annotated content data is illustrated in screen shots 140. Screen shots 140 shows four different screen shots of an annotated video. The transcribed text from the audio data here is "Hey There! Want to get some coffee? Talk soon! Okay, bye." In this example, the annotation application 111 consulted with the library 113 and replaced the word "coffee" with an image of a coffee mug and replaced the phrase "okay, bye" with the stylized text "bye." The implementor 112 may have consulted with the preferences 115 to determine that the user account prefers food emojis and likes to use stylized text. The implementor 112 may have consulted with the semantics engine 116 to determine that the phrases "Hey There" and "Talk soon" were said emphatically. Accordingly, the stylized text "Hey There" and "Talk soon" may be automatically modified to include exclamation points.

At block 157, the content data, the stylized annotation data, and the metadata may be sent to the electronic device 130 (e.g., via a cellular network). Alternatively, or in addition, the electronic device 120 may send the content data and metadata to a server (e.g., server 120) to be accessed by and/or distributed to electronic device 130.

The steps at blocks 151-157 may be performed after the entire content data is annotated or, alternatively, may be performed for segments of content data. For example, every set amount of time (e.g., 1 second), content data may be transcribed and used to annotate the segment of content data corresponding to the amount of time. The stylized annotated content data may be displayed on the electronic device 110 in near real time as the content data is being annotated. Additionally, or alternatively, the segments of stylized annotation data may be sent to electronic device 130, as well as corresponding metadata, as they are completed. In this manner, electronic device 130 may display annotated content data in near real time as it is received on the electronic device 130.

At block 158, the electronic device 130 may receive the content data, stylized annotation data, and the metadata from the electronic device 110. At block 159, using annotation application 111, also running on electronic device 130, electronic device 130 may use the stylized annotation data and metadata to annotate the content data on the electronic device 130 and display and/or otherwise present the annotated content data on electronic device 130. In this manner, the stylized annotation data will appear overlaid on the content data on electronic device 130 just as it did on electronic device 110 (e.g., screen shots 130 are the same as screen shots 140). In one example, the annotated content data may be sent and received using well-known text message (SMS text), email, social media, and/or file sharing technologies. In yet another example, electronic device 130 may access and view annotate media content by accessing a feed hosted by a server (e.g., server 120) or by using a web-based application. In one example, the electronic device FIG. 1B is a conceptual diagram illustrating sentiment detection via sentiment engine 116 according to embodiments of the present disclosure. The sentiment detection component 175 may include a voice activity detection (VAD) component 176, a trained model 177 and an attention model 178. The audio data 171 (e.g., captured by a electronic device 110) may be inputted into the VAD component 176. The sentiment detection component 175 may reside with electronic device 110, with another device proximate to, and in communication with electronic device 110 or with a remote device such as with sever 120. If the sentiment detection component 175 does not reside on the electronic device 110 that is capturing audio, the sentiment detection component 175 may not necessarily include the VAD component 176 (or may not necessarily include other components) and may or may not include other components as well. The precise composition of the sentiment detection component 175 depends on system configuration.

The VAD component 176 may determine if the audio data 171 includes speech spoken by a human or voice activity by a human, and may determine a portion of the audio data 171 that includes speech or voice activity. The VAD component 176 may send the portion of the audio data 171 including speech or voice activity to the user recognition component 172. The VAD component 176 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 176 may implement a limited classifier configured to distinguish speech from background noise. The classifier may be implemented by techniques such as linear classifiers, support vector machines, and decision trees. In still other examples, the electronic device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 172 (which may be located on a same or different device as the sentiment detection component 175) may communicate with the sentiment detection component 175 to determine user audio data 173 that corresponds to a particular user profile. The user recognition component 172 may recognize one or more users. For example, the user recognition component 172 may identify stored data corresponding to a voice profile associated with the user profile, and determine a confidence level that a portion of the input audio data corresponds to the voice profile based on analyzing the stored data. The user recognition component 172 may determine if the confidence level meets/satisfies a threshold. If the confidence level for a portion of the input audio data is below a threshold, then the respective portion of input audio is discarded as it does not represent speech from the user associated with the user profile. If the confidence level for a portion of the input audio data meets/satisfies a threshold, then the respective portion of the input audio data is stored as the user audio data 173.

The user audio data 173 may be a portion of the audio data 171 that includes speech or one or more utterances from a particular user associated with the user profile. In other words, audio data representing a particular user's speech may be isolated and stored as the user audio data 173 for further analysis. In an example embodiment, the user may be associated with or using the electronic device 110, and may have provided permission to record and analyze his or her voice/conversations to determine a sentiment indication corresponding to the conversation.

Prior to performing further analysis on the user audio data 173, the sentiment detection component 175 may confirm that the user has granted permissions to analyze speech spoken by the user for sentiment detection.

The user audio data 173 may be input into an encoder to determine frame feature vector(s) 174. The frame feature vector(s) 514 may represent audio frame level features extracted from the user audio data 173. One frame feature vector 174 may represent features extracted for a window of audio (e.g., 25 ms), where the window slides or moves in increments (e.g., increments of 10 ms) to extract features represented by the next frame feature vector. In other embodiments, one frame feature vector 174 may represent features corresponding to an individual word in the utterance. The sentiment detection component 175 may determine the portions of user audio data 173 that correspond to individual words and extracts features from the respective portions of audio using the encoder. The frame feature vector(s) 174 may be derived by spectral analysis of the user audio data 173.

In an example embodiment, the sentiment detection component 175 determines that the user audio data 173 includes an entire utterance. That is, the sentiment detection component 175 may determine that a beginpoint of the user audio data 173 corresponds to a beginpoint of an utterance, and an endpoint of the user audio data 173 corresponds to an endpoint of the utterance. In this case, the frame feature vectors 174 may represent the words in the entire utterance.

The trained model 177 may process the frame feature vector(s) 174. The trained model 177 is trained on acoustic and lexical features and may be a combined sentiment detection model. Even though only acoustic features may be available for sentiment detection, the trained model 177 is configured to infer some semantic and contextual features learned from lexical information during training.

The trained model 177 may be a neural network, for example a bi-directional LSTM. The output of the trained model 177 may be fed into an attention model 178. The attention model 178 may be a neural network, for example a recurrent neural network. The attention model 178 may be configured to emphasize relevant portions of an input utterance. The attention model 178 may be configured to take in output data from the trained model 177 and produce an output for every time step (e.g., a 10 ms audio frame). The attention model 178 may be configured to aggregate information from different time intervals/audio frames of the input audio data to determine how certain parts of the utterance affects determining of the sentiment. For example, an acoustic representation of a first word in the utterance may indicate a high arousal implying anger, in which case the attention model 178 is configured to realize that the first word corresponds to an anger sentiment and that that should affect the processing of the other words in the utterance to ultimately determine a sentiment category corresponding to the utterance. In some embodiments, the functionality described here of the attention model 178 may be performed by one or more layers of the trained model 177. That is, the attention model 178 may be part of the trained model 177 and may not be a separate component from the trained model 177. One or more layers of the trained model 177 may be trained to perform the functionalities of the attention model 178.

The attention model 178 may output a score 179 indicating a likelihood of the utterance corresponding to a sentiment indication 180. The attention model 179 may output model output data including an indicator of a sentiment or a N-best list of scores. The sentiment detection component 175 may predict from multiple sentiment categories, including but not limited to, happiness, sadness, anger and neutral. In an example embodiment, the sentiment indicator 180 may be determined after score(s) 179 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 175 is configured to determine a sentiment indication 180 at an utterance-level. The sentiment detection component 175 may use contextual information from the entire utterance to determine an overall sentiment of the speaker when speaking the utterance. The sentiment detection component 175 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 175 may be configured to determine a sentiment category on a word level (that is for each word within an utterance).

The trained model 177 may take many forms, including a neural network. The trained model 177 may employ a bi-directional LSTM. A neural network may include a number of layers, from input layer 1 through output layer N. Each layer includes one or more nodes and is configured to input a particular type of data and output another type of data. A layer may be represented by a data structure that represents the connections between layers and operations within a layer. The neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from the penultimate layer (not shown). While values for the input data/output data of a particular layer are not known until a neural network is actually operating during runtime, the data describing the neural network describes the structure and operations of the layers of the neural network.

Figure 1C:
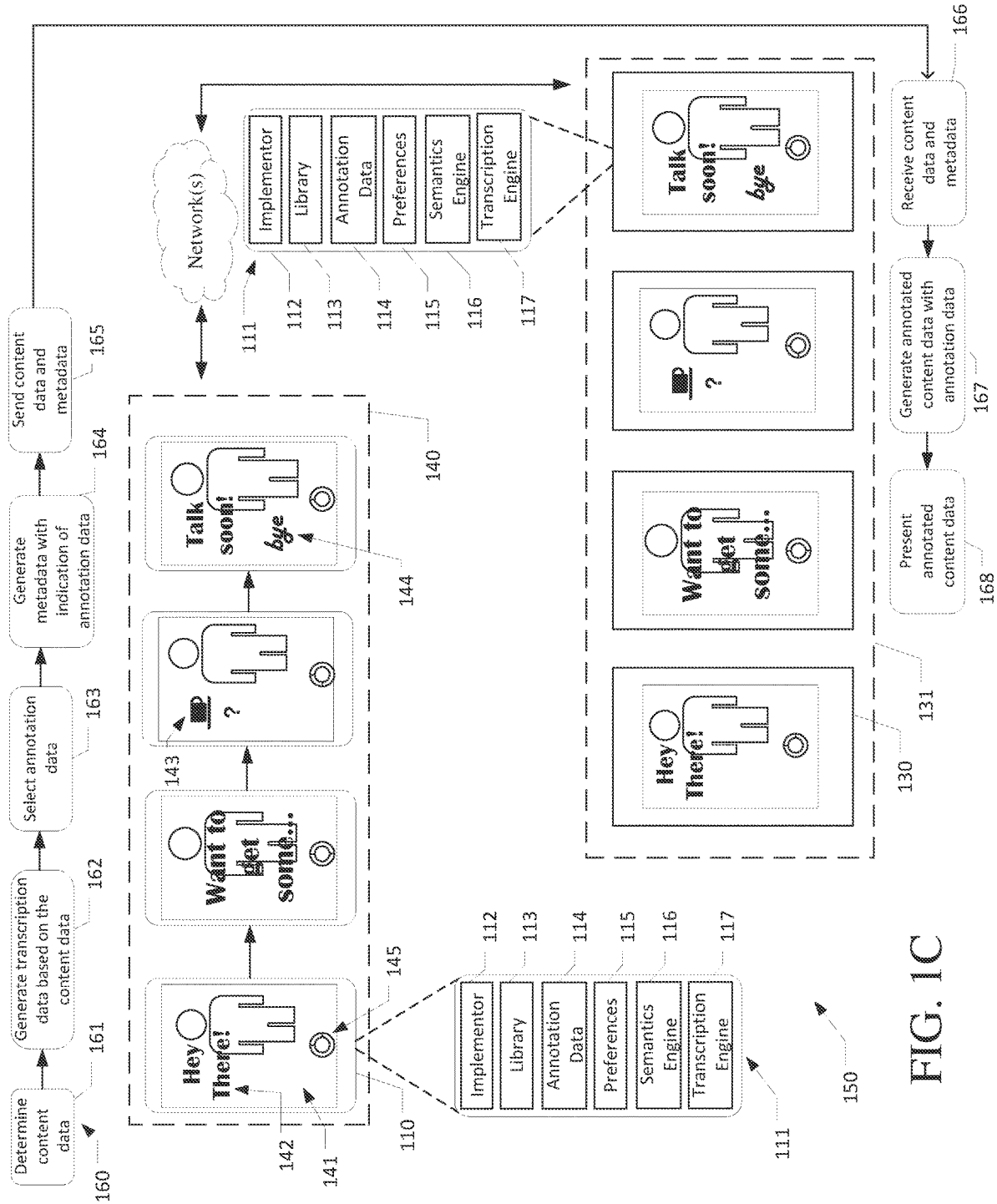
FIG. 1C is a schematic illustration of an example use case for selecting annotated data and sending metadata corresponding to the annotated data in accordance with one or more example embodiments of the disclosure.

Referring now to FIG. 1C, an alternative example use case 150 for annotating content data in near real-time is depicted in accordance with one or more example embodiments of the disclosure. In the illustrated example, similar to use case 100, the electronic device 110 and electronic device 130 may run annotation application 111 including implementor 112, library 113, annotation data 114, preferences 115, semantics engine 116, and transcription engine 117. Further, electronic device 110 and electronic device 130 may communicate with one another in the same manner as described above with respect to FIG. 1A.

Screen shots 140 are the same screen shots illustrated in FIG. 1A and thus illustrate annotated content data displayed on electronic device 110. As is shown, content data 141 is illustrated behind annotation data 142, such that annotation data 142 is overlaid on content data 141. Annotation data 142 includes text emoji 143 as well as stylized text 144. Time indicator 145 may also be included and may indicate how much time is remaining in the annotated content data. Time indicator 145 may be a circle with a time marker to visually indicate how much time is left in the annotated video. Screen shots 131 illustrate the annotated content displayed on electronic device 130.

To initiate the actions of annotating content data via the annotation platform, an example process flow 160 is presented and may be performed, for example, by one or more modules at electronic device 110 and/or electronic device 130. The electronic device 110 and/or electronic device 130 may include at least one memory that stores computer-executable instructions and at least one processor configured to access the at least one memory and execute the computer-executable instructions to perform various actions or operations, such as one or more of the operations in the process flow 150 of FIG. 1C.

At block 161, content data may be determined. This may involve a user using electronic device 110 recording video data, audio data, image data and/or any other audio/visual data on electronic device 110. For example, video data may include audio data and visual data that may be recorded and/or captured using a camera and a microphone on the electronic device 110. Alternatively, at block 161, the electronic device may obtain content data from one or more devices, such as a different electronic device or a server.

At block 162, the content data determined at block 161 may be analyzed by transcription engine 117 to determine transcription data. In another example, the content data, or a portion thereof, may be sent to a different device (e.g., server) to determine transcription data. The content data and/or audio data may be processed by transcription engine 117 to determine words and phrases associated with the content and/or audio data. The transcription engine 117 may associate the transcribed data with time points along the audio data. For example, the transcription engine may indicate that the word "coffee" occurred between 4.5 and 5.5 seconds. Electronic device 110 may separate audio data from content data to facilitate transcription of the audio data. As explained above, the transcription engine 117 may be any well-known software, instructions, and/or application for transcribing text from audio and/or media content data. Running transcription engine 117 on electronic device 110 may facilitate near-real time annotation of the content data, may preserve privacy and/or may otherwise improve the user experience.

At block 163, annotation data corresponding to the content data may be determined. To determine the annotation data, the transcription data may be analyzed by library 113 to determine whether any of the transcription data is associated with any content entries in library 113. As explained in greater detail below with respect to FIG. 2D, key phrases in the transcription data may be identified and matched with an entry in the library of phrases. The entry may include one or more types of annotation data corresponding to the key phrase. The implementor 112 may coordinate with preferences 115 and/or semantics engine 116 to determine which annotation data to retrieve. For example, if multiple entries are associated with a phrase, semantics engine 116 and/or preferences 115 may be used to select between the options. In one example, semantics engine 116 may determine that a user is angry and this information be employed to select between two different annotation data options corresponding to the key phrase. If multiple libraries of key phrases are available, semantics engine 116 and/or preferences 115 may also be used to determine which library to use. Preferences manager 115 may further inform implementor 112 of how much text to replace with content data and/or how much text to incorporate into the content data. For example, a user account may indicate that a user prefers to include all or a significant amount of text in the annotated text. The user account may also inform implementor 112 of how often to replace text with content data or even what type of text to replace with content data (e.g., food text, emotion text, action text, sounds, etc.). Presentation parameters corresponding to the annotation data (e.g., size, color, duration, transitions, location on the display, movement, etc.) may be determined based on semantics engine 116, preferences 115 and/or default settings.

At block 164, metadata may be generated and may be indicative of the selected annotated data (e.g., content) associated with the content data as well as reference time points and presentation information corresponding to the selected annotated data. For example, the metadata may be indicative of a coffee emoji time points 14-15 seconds as well as the size, color and presentation location and duration of the emoji. In one example, annotation parameters may include rendering size, presentation location, style, color, and/or presentation duration of the annotation data. For example, implementor 112 may determine a sentiment indication to adjust and/or select one or more annotation parameters. In one example, a user may emphasize the phrase "I Love You." The sentiment indication may indicate that this phrase was emphasized and that the user is happy and based on the sentiment indication, a heart emoji associated with this phrase may be enlarged and positioned in the center of the display. Alternatively, or in addition, preferences 115 may be consulted to determine that a user prefers the color purple. In one example, this information may be used to change the color of the heart associated with the phrase "I Love You" to purple.

Exemplary annotated content data is illustrated in screen shots 140. Screen shots 140 shows four different screen shots of an annotated video. The transcribed text from the audio data here is "Hey There! Want to get some coffee? Talk soon! Okay, bye." In this example, the annotation application 111 consulted with the library 113 and replaced the word "coffee" with an image of a coffee mug and replaced the phrase "okay, bye" with the stylized text "bye." The implementor 112 may have consulted with the preferences 115 to determine that the user account prefers food emojis and likes to use stylized text.

At block 165, the content data and the metadata may be sent to the electronic device 130 (e.g., via a cellular network). Alternatively, or in addition, the electronic device 120 may send the content data and metadata to a server (e.g., server 120) to be accessed by electronic device 130.

The steps at blocks 161-165 may be performed after the entire content data is annotated or, alternatively, may be performed for segments of content data. For example, every set amount of time (e.g., 1 second), content data may be transcribed and used to annotate the segment of content data corresponding to the amount of time. The annotated content data may be displayed on the electronic device 110 in near real time as the content data is being annotated. Additionally, or alternatively, the metadata corresponding to the annotated day may be sent to electronic device 130 as they are completed. In this manner, electronic device 130 may display annotated content data in near real time as it is received on the electronic device 130. In another example, the metadata corresponding to segments of annotated content data may be displayed in near real time on electronic device 110 and may be combined together and sent to electronic device 130 and/or server 120.

At block 166, the electronic device 130 may receive the content data and the metadata from the electronic device 110. At block 167, using annotation application 111, also running on electronic device 130, electronic device 130 may use the metadata to annotate the content data on the electronic device 130. The metadata may inform electronic device 130 to present a certain type of annotation data for a certain duration at certain reference points using certain presentation parameters. Electronic device 130 may retrieve the annotation data from annotation data 114 and may annotate the received content data according to the instructions in the metadata and render the annotated content data on the electronic device 130.

At block 168, electronic device 130 may display and/or otherwise present the annotated content data on electronic device 130. In this manner, the annotation data will appear overlaid on the content data on electronic device 130 just as it did on electronic device 110 (e.g., screen shots 130 are the same as screen shots 140). In one example, the content data and metadata may be sent and received using well-known text message (SMS text), email, social media, and/or file sharing technologies. In yet another example, electronic device 130 may access and view annotate media content by accessing a feed hosted by a server (e.g., server 120) or by using a web-based application.

Figure 1D:
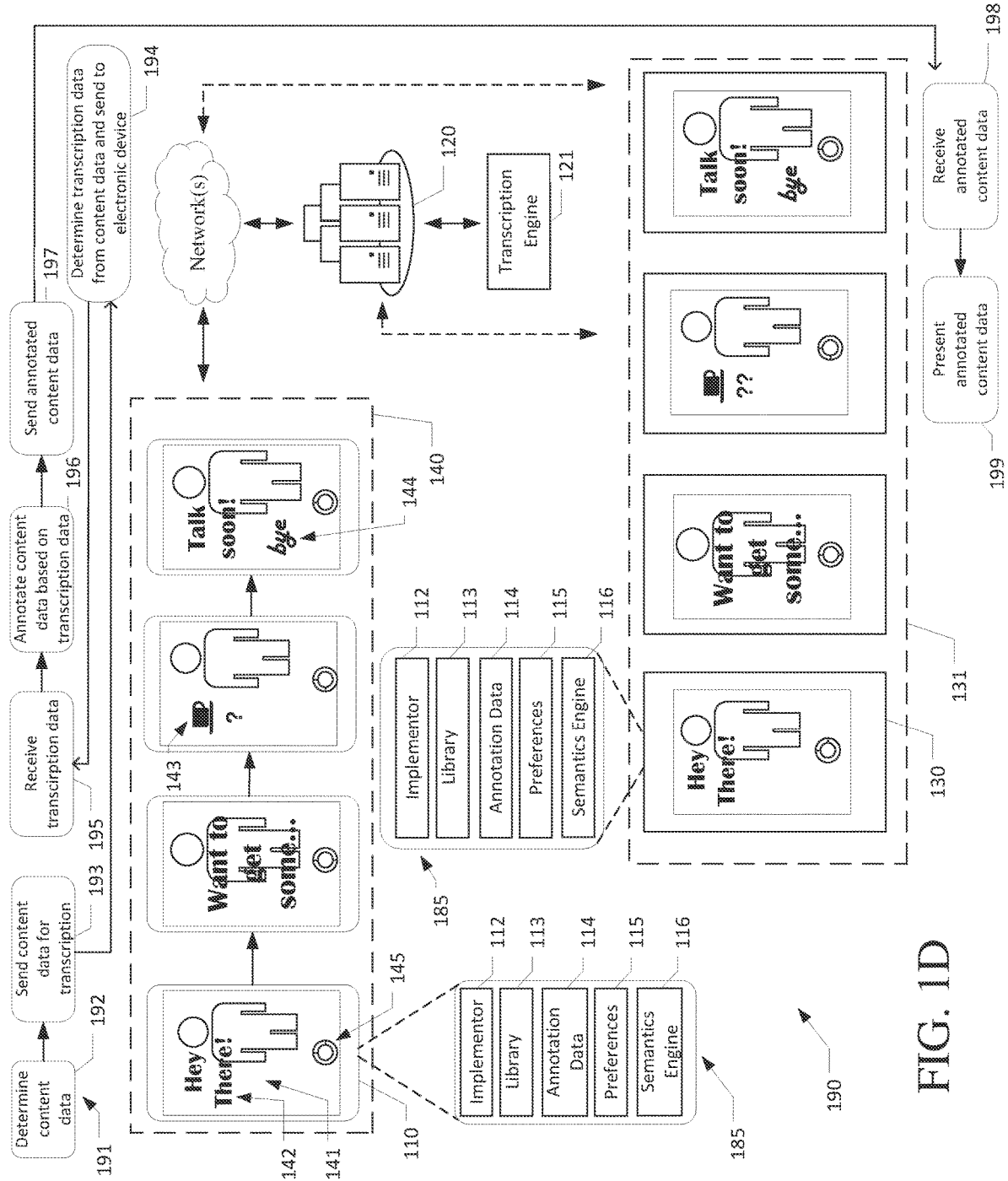
FIG. 1D is a schematic illustration of an example use case for determining and sending annotated content data in accordance with one or more example embodiments of the disclosure.

Referring now to FIG. 1D, an alternative example use case 190 for annotating content data in near real-time is depicted in accordance with one or more example embodiments of the disclosure. In the illustrated example, the electronic device 110 and electronic device 130 may run annotation application 185 including implementor 112, library 113, annotation data 114, preferences 115, and semantics engine 116. Annotation application 185 is the same as annotation application 111, but without transcription engine 117. In the illustrated user case 190, the electronic device 110 may generate or otherwise obtain content data, may generate annotated content data in near real-time and may communicate with electronic device 130 and/or one or more servers 120. Electronic device 110, server 120 and/or electronic device 130 may communicate via any well-known wired or wireless system (e.g., Bluetooth, Bluetooth Low Energy (BLE), near field communication protocol, Wi-Fi, cellular network, etc.).

Similar to FIG. 1A, screen shots 140 illustrate annotated content data displayed on electronic device 110. As is shown, content data 141 is illustrated behind annotation data 142, such that annotation data 142 is overlaid on content data 141. Annotation data 142 includes text emoji 143 as well stylized text 144. Time indicator 145 may also be included and may indicate how much time is remaining in the annotated content data. Time indicator 145 may be a circle with a time marker to visually indicate how much time is left in the annotated video. Screen shots 131 illustrate the annotated content displayed on electronic device 130.

To initiate the actions of annotating content data via the annotation platform, an example process flow 191 is presented and may be performed, for example, by one or more modules at electronic device 110, electronic device 130, and/or server 120. The electronic device 110, electronic device 130, and/or server 120 may include at least one memory that stores computer-executable instructions and at least one processor configured to access the at least one memory and execute the computer-executable instructions to perform various actions or operations, such as one or more of the operations in the process flow 191 of FIG. 1D.

At block 192, content data may be determined. This may be the same as step 151. At block 193, the content data determined at block 192 may be sent to server 120 for data transcription. Alternatively, only a portion of the content data, such as the audio data, may be sent to server 120. As explained above, electronic device 110 may separate audio data from content data to facilitate transcription of the content data. At block 194, the content data and/or audio data may be processed by transcription engine 121 on server 120 to determine text (e.g., words and phrases) associated with the content and/or audio data. The transcription engine 121 may associate the transcribed data with time points along the content data and/or audio data. For example, the transcription engine may indicate that the text "coffee" occurred between 4.5 and 5.5 seconds. Transcription engine 121 may be the same or similar to transcription engine 117. Upon determining the transcription data, server 120 may send the transcription data to electronic device 110.

At block 195, electronic device 110 may receive the transcription data. At block 255, the transcription data may be analyzed by library 113 to determine whether any of the transcription data is associated with any content entries in library 113. As explained in greater detail below with respect to FIG. 2D, key phrases in the transcription data may be identified and matched with an entry in the library of phrases. The entry may include one or more types of annotation data corresponding to the key phrase. The implementor 112 may coordinate with preferences 115 and/or semantics engine 116 to determine which annotation data to retrieve. For example, if multiple entries are associated with a phrase, semantics engine 116 and/or preferences 115 may be used to select between the options. In one example, semantics engine 116 may determine that a user is angry and this information be employed to select between two different annotation data options corresponding to the key phrase. If multiple libraries of key phrases are available, semantics engine 116 and/or preferences 115 may also be used to determine which library to use. Preferences manager 115 may further inform implementor 112 of how much text to replace with content data and/or how much text to incorporate into the content data. For example, a user account may indicate that a user prefers to include all or a significant amount of text in the annotated text. The user account may also inform implementor 112 of how often to replace text with content data or even what type of text to replace with content data (e.g., food text, emotion text, action text, sounds, etc.).

The annotation data and the content data may be combined in an overlaid fashion to generate annotated content data, as shown in screen shots 140 and screen shots 130. Annotation application 185 may annotate the content data at reference time points corresponding to the phrase in the content data. Further, annotation data parameters may be determined. In one example, annotation parameters may include rendering size, presentation location, style, color, and/or presentation duration of the annotation data. For example, implementor 112 may determine a sentiment indication to adjust and/or select one or more annotation parameters. In one example, a user may emphasize the phrase "I Love You." The sentiment indication may indicate that this phrase was emphasized and that the user is happy and based on the sentiment indication, a heart emoji associated with this phrase may be enlarged and positioned in the center of the display. Alternatively, or in addition, preferences 115 may be consulted to determine that a user prefers the color purple. In one example, this information may be used to change the color of the heart associated with the phrase "I Love You" to purple.

At block 197, the annotated content data generated at block 196 may be sent directly to the electronic device 130 (e.g., via a cellular network) and/or server 120 (e.g., via the Internet) to be accessed by electronic device 130.

The steps at blocks 192-197 may be performed after the entire content data is annotated or, alternatively, may be performed for segments of content data. For example, every set amount of time (e.g., 1 second), content data may be transcribed and used to annotate the segment of content data corresponding to the amount of time. The annotated content data may be displayed on the electronic device 110 in near real time as the content data is being annotated. Additionally, or alternatively, the segments of annotated content data may be sent to electronic device 130 and/or server, as they are completed. In this manner, electronic device 130 may display annotated content data in near real time as it is received on the electronic device 130. In another example, the segments of annotated content data may be displayed in near real time on electronic device 110 and may be combined together to form a longer combined segment of annotated content data that may then be sent to electronic device 130 and/or server 120.

At block 198, the electronic device 130 may receive the annotated content data from the electronic device 110 and/or server 120. At block 199, electronic device 130 may display and/or otherwise present the annotated content data on electronic device 130. In this manner, the annotation data will appear overlaid on the content data on electronic device 130 just as it did on electronic device 110 (e.g., screen shots 130 are the same as screen shots 140). In one example, the annotated content data may be sent and received using well-known text message (SMS text), email, social media, and/or file sharing technologies. In yet another example, electronic device 130 may access and view annotated media content by accessing a feed hosted by a server (e.g., server 120) or by using a web-based application. Where segments of annotated content data are sent to electronic device 130 (e.g., via multiple annotated content data segments), electronic device 130 may combine annotated content data segments to form a complete annotated content data segment. The segments may be sequenced as they are received or according to other instructions received by electronic device 130.

Illustrative Process and Use Cases

Figure 2A:
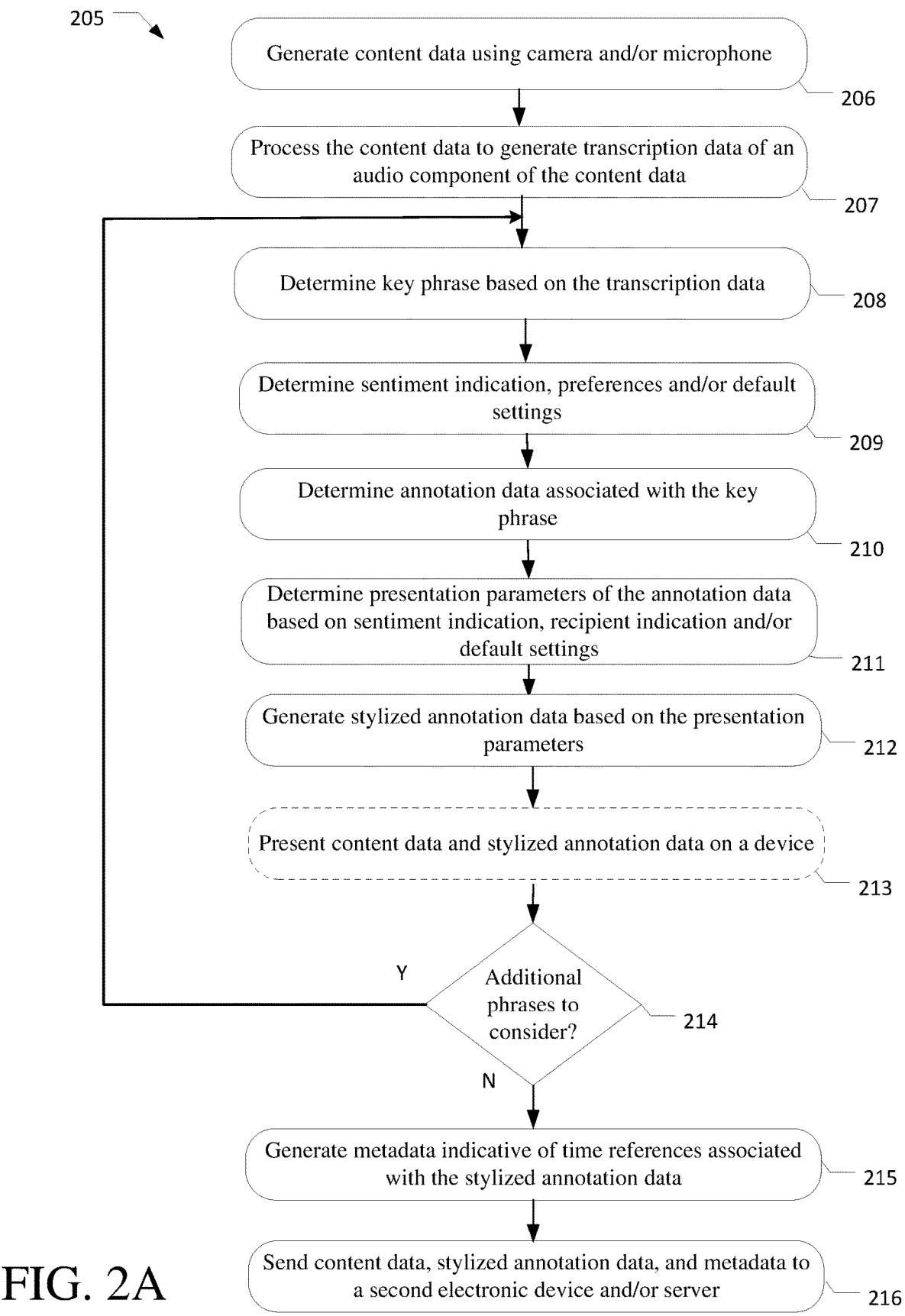
FIG. 2A is a schematic illustration of an example process flow for generating stylized annotated data and sending the stylized annotated data and metadata in accordance with one or more example embodiments of the disclosure.

FIG. 2A depicts an example process flow 205 for determining content data including audio data, determining transcription data, and generating stylized annotation data. Some or all of the blocks of the process flows in this disclosure may be performed in a distributed manner across any number of devices. Some are all of the operations of the process flow 205 may be optional and may be performed in a different order.

At block 206, computer-executable instructions stored on a memory of a device, such as an electronic device, may be executed to generate media content data such as such as image data, video data, and/or audio data. For example, a user using an electronic device such as a mobile phone may capture video data including audio data captured by a microphone and visual data captured by camera on the mobile phone and that data may be stored and/or retrieved on the electronic device. For example, the video data may be prerecorded. Alternatively, at block 206, a device may receive content data from another device such as another mobile phone or a server and may store and/or retrieve that data on the electronic device.

At block 207, computer-executable instructions stored on a memory of a device, such as an electronic device, may be executed to process the content data to determine transcription data based on the content data and audio data and corresponding to time points of content data and/or audio data. As explained above, the transcription engine may be a well-known speech processing engine. The transcription data may include or correspond to additional information about the location of the transcription data with respect to time points in the content data and/or audio. For example, a phrase corresponding to the transcription data may be associated with a time point or range of times points corresponding to the content data and/or audio data.

At block 208, computer-executable instructions stored on a memory of a device, such as an electronic device, may be executed to determine that a phrase is a key phrase. A phrase may be one letter, multiple letters in various orders with and/or without spacing(s), one word, more than one word, images (e.g., emojis, gifs, other symbols, etc.), and/or anything else that conveys meaning in the underlying content data. This process is explained in more detail with respect to FIG. 2D and involves comparing the transcription data to one or more libraries of key phrases.

At block 209, computer-executable instructions stored on a memory of a device, such as an electronic device, may be executed to determine a sentiment indication, user preferences and/or default settings. A sentiment indication may be determined in the manner described above with respect to FIG. 1B. Further, user preferences (e.g., a preference for a certain color, emoji type, or image type) may be identified in a user profile. Also, default settings may be system default settings applied to all users (e.g., black text). The annotation application may maintain certain rules or hierarchies for conflicting preferences. For example, user preferences may control in the event of a conflict with default settings.

At block 210, computer-executable instructions stored on a memory of a device, such as an electronic device, may be executed to determine annotation data associated with the key phrase determined at block 208. For example, a library of phrases associated with certain content may be consulted and content associated with the key phrase entry in the library of phrases may be identified and selected. The annotation data identified in the library may be stored on the electronic device may be retrieved by the electronic device. In one example, an entry for a key phrase identified at block 208 may involve multiple content options. A preferences manager and/or a semantics engine may be consulted to select between different options of content. Alternatively, or in addition, default settings may be used. For example, where a word or phrase is associated with multiple content data options (e.g., GIFs, memes, stylized text), a user profile maintained by the preferences manager may determine which content data to select. For example, the user may prefer emoji of stylized text. The preferences manager may also be consulted to determine how much text should be incorporated into the media content and/or how much text should be replaced with content data. In another example, if the semantics engine determines that the user has a positive sentiment, an emoji with a positive message may be selected.

At block 211, computer-executable instructions stored on a memory of a device, such as an electronic device, may be executed to determine the presentation parameters for the annotation data associated with a key phrase. For example, the presentation of annotation data (i.e., content) may be determined based on preferences saved to a user profile, semantics indication from the semantics engine, a recipient indication and/or default settings. The recipient indication may be indicative of the intended recipient of the content data, annotated content data, stylized annotation data and/or metadata. For example, the system may know the contact for which the stylized message is intended for and may further categorize this contact as a friend, family, spouse, work colleague and/or any other relevant categorization. Each category may be pre-programmed or determined according to a user profile to correspond to certain presentation parameters. For example, the recipient indication may influence the size of the annotation data, the location of the annotation relative to the content data, the color of the annotation data, the duration of the annotation data, and any other presentation parameters described herein. In one example, a recipient indication corresponding to the spouse category may adjust the presentation parameters such that the annotation data does not obstruct a face of an individual detected in the content data.

After annotation data has been determined at block 208, the presentation and arrangement of the annotation data over the content data must be determined. The electronic device may place the content data and/or text at corresponding time points along the content data. For example, if the content data includes an image of a pizza slice and the word pizza is said 6.5 seconds, the pizza slice may be overlaid onto the content data at this time. The annotation application may be designed to keep the text and/or content data on the screen for a set period of time (e.g., one second). Alternatively, or additionally, the text and/or content data may slowly exit the screen over time (e.g., move from an original location to a perimeter location on the screen). Regarding, the position of the text and/or annotation data, the text and/or annotation data may be positioned in the background. For example, the annotation application may identify one or more individuals and may position the text and/or annotation data in a manner that does not obscure the individuals. Alternatively, text and/or annotation data may be strategically positioned with respect to the individuals (e.g., for comedic value or to add contextual information). For example, a slice of pizza may be placed near the face of an individual or on the face of an individual. In one example, the size, color and orientation of text and/or annotation data may also be determined based on user preferences or default settings. In another example, the size and/or punctuation of the text may be determined based on a semantics indication. For example, the semantic indication may indicate that the user said a phrase emphatically and thus an exclamation point may be added to text corresponding to the phrase.

At block 212, computer-executable instructions stored on a memory of a device, such as an electronic device, may be executed to generate stylized annotation data based on the presentation parameters and selected annotated data. In one example, the annotation data may be sized, color adjusted, and positioned on the display according to the presentation parameters. This step may involve rendering the stylized annotation data on electronic device 110. The stylized annotation data may be combined with the content data but is distinct and standalone from the content data. At optional block 213, computer-executable instructions stored on a memory of a device, such as an electronic device, may be executed to display the stylized annotation data combined with the content data, or a portion thereof, according to the associated reference time points.

At decision 214, computer-executable instructions stored on a memory of a device, such as an electronic device, may be executed to determine whether additional phrases should be considered as key phrases. For example, if only a portion of the transcription data corresponding to content data was analyzed to determine the presence of key phrases, additional transcription data that was not previously analyzed may be analyzed and blocks 208 to 213 may be repeated. If there is not additional transcription data to analyze, block 215 may be initiated.

At block 215, computer-executable instructions stored on a memory of a device, such as an electronic device, may be executed to generate metadata indicative of the time reference time points to inform electronic device 130 of how to combine the stylized annotation data with the content data. At block 216, computer-executable instructions stored on a memory of a device, such as an electronic device, may be executed to send the content data, stylized annotation data, and the metadata to a second electronic device (e.g., a second mobile phone). For example, the content data, stylized annotation data, and metadata may be sent directly to the second electronic device via a cellular network. Alternatively, the content data, stylized annotation data, and metadata may be sent to a server. The server may send the content data, stylized annotation data and metadata to the second electronic device and/or may make the content data, stylized annotation data and metadata available to the electronic device.

Figure 2B:
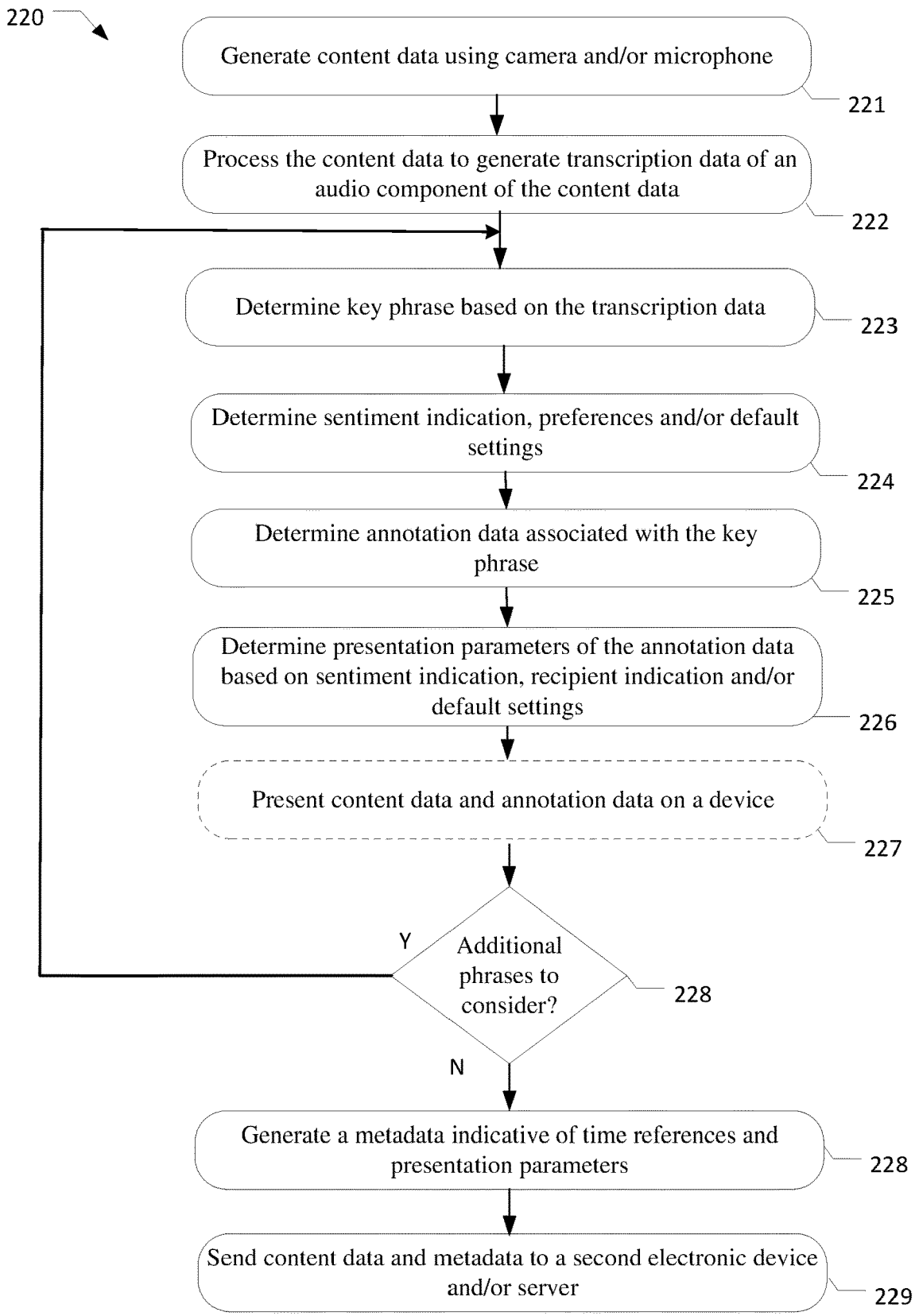
FIG. 2B is a schematic illustration of an example process flow for selecting annotated data and sending content data and metadata corresponding to the annotated data in accordance with one or more example embodiments of the disclosure.

FIG. 2B depicts an example process flow 220 for determining content data including audio data, determining transcription data, and determining annotation data and metadata. Some or all of the blocks of the process flows in this disclosure may be performed in a distributed manner across any number of devices. Some are all of the operations of the process flow 270 may be optional and may be performed in a different order.

At block 221, computer-executable instructions stored on a memory of a device, such as an electronic device, may be executed to generate media content data such as such as image data, video data, and/or audio data. Block 221 may be the same as block 206, illustrated in FIG. 2A. At block 222, computer-executable instructions stored on a memory of a device, such as an electronic device, may be executed to process the content data to determine transcription data based on the content data and audio data and corresponding to time points of content data and/or audio data. Block 222 may be the same as block 207, illustrated in FIG. 2A.

At block 223, computer-executable instructions stored on a memory of a device, such as an electronic device, may be executed to determine that a phrase is a key phrase. Block 223 may be the same as block 208, illustrated in FIG. 2A. At block 224, computer-executable instructions stored on a memory of a device, such as an electronic device, may be executed to determine a sentiment indication, user preferences and/or default settings. Block 224 may be the same as block 209, illustrated in FIG. 2A. At block 225, computer-executable instructions stored on a memory of a device, such as an electronic device, may be executed to determine annotation data associated with the key phrase determined at block 223. Block 225 may be the same as block 210, illustrated in FIG. 2A. At block 226, computer-executable instructions stored on a memory of a device, such as an electronic device, may be executed to determine the presentation parameters for the annotation data associated with a key phrase. Block 226 may be the same as block 211, illustrated in FIG. 2A. At optional block 227, computer-executable instructions stored on a memory of a device, such as an electronic device, may be executed to display the annotation data combined with the content data, or a portion thereof, according to the associated reference time points. For example, the annotated content data may be displayed on a display of a mobile phone. The audio and any content that is audio data may be simultaneously played on speakers on the mobile phone. At decision 228, computer-executable instructions stored on a memory of a device, such as an electronic device, may be executed to determine whether additional phrases should be considered as key phrases. Decision 228 may be the same as decision 214, illustrated in FIG. 2A. If it is determined at decision 228 that additional phrases should be considered, blocks 223-228 may be repeated.

If it is determined at decision 228 that additional phrases should not be considered, at block 228, computer-executable instructions stored on a memory of a device, such as an electronic device, may be executed to generate metadata based on the annotation data and time references. The metadata may be indicative of the annotation data determined at block 224, presentation parameters determined at block 226 and the reference time points associated with such annotated data. The metadata may inform a different device (e.g., a second electronic device) running an annotation application of how to generate annotated media content based on the annotation data, presentation parameters and the reference time points. The annotation data may be stored in a library on the second electronic device. The metadata may further inform the second electronic device of how to present the annotation data. The second electronic device may render the annotated content data based on the metadata and content data.

At block 229, computer-executable instructions stored on a memory of a device, such as an electronic device, may be executed to send the content data and the metadata to a second electronic device (e.g., a second mobile phone). For example, the content data and metadata may be sent directly to the second electronic device via a cellular network. Alternatively, the content data and metadata may be sent to a server. The server may send the content data and metadata to the second electronic device and/or may make the content data and metadata available to the electronic device.

Figure 2C:
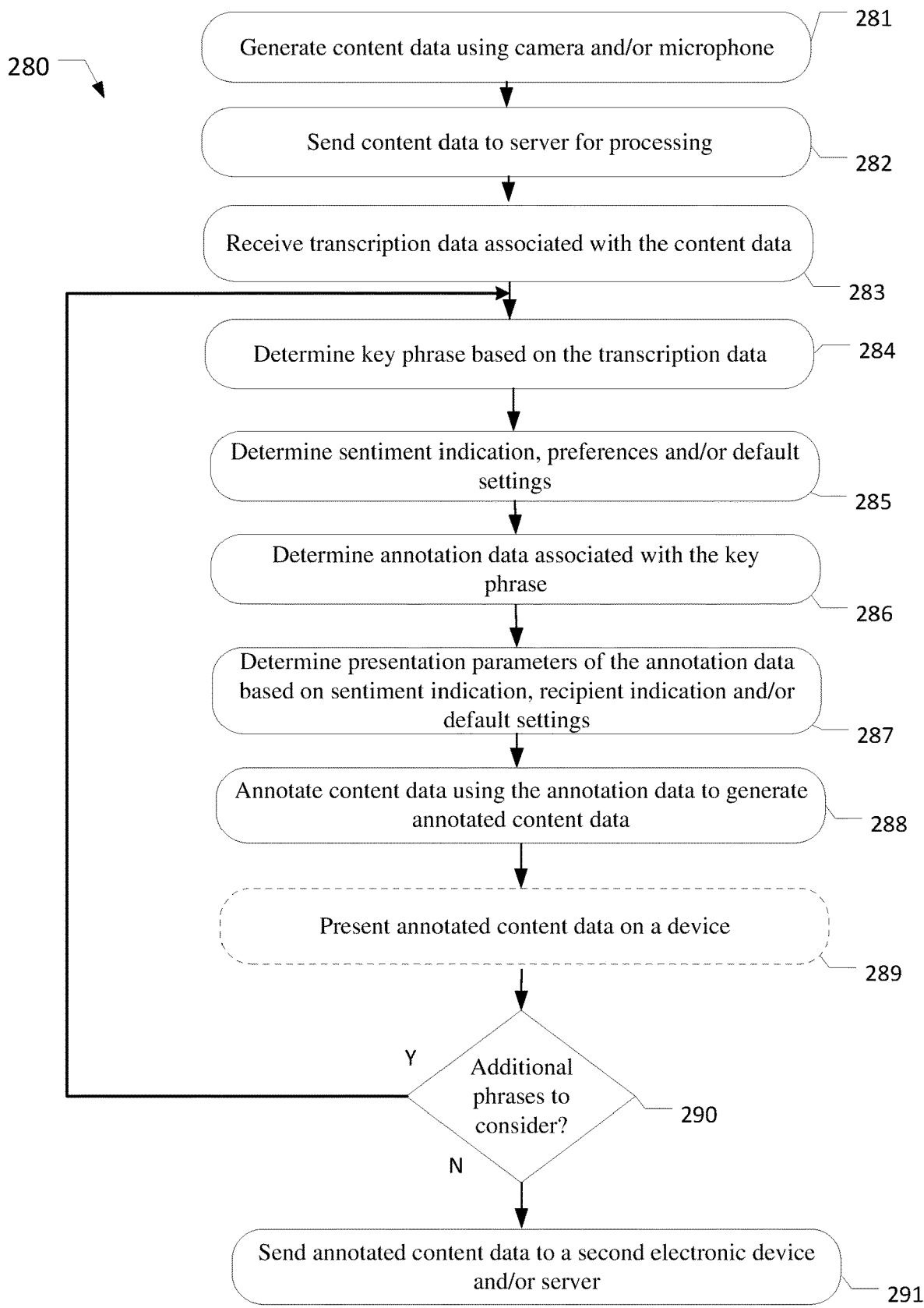
FIG. 2C is a schematic illustration of an example process flow for determining and sending annotated content data on an electronic device in accordance with one or more example embodiments of the disclosure.

FIG. 2C depicts an example process flow 280 for determining content data including audio data, receiving transcription data, and annotating the content data. Some or all of the blocks of the process flows in this disclosure may be performed in a distributed manner across any number of devices. Some are all of the operations of the process flow 280 may be optional and may be performed in a different order.

At block 281, computer-executable instructions stored on a memory of a device, such as an electronic device, may be executed to generate media content data such as such as image data, video data, and/or audio data. Block 218 may be the same as block 206 illustrated in FIG. 2A. At block 282, computer-executable instructions stored on a memory of a device, such as an electronic device, may be executed to send the content data to a server to be transcribed using a transcription engine. Alternatively, the electronic device may only send a portion of the content data, such as the audio data portion, to the server for transcription. At block 283, computer-executable instructions stored on a memory of a device, such as an electronic device, may be executed to receive transcription data corresponding to the content data and/or audio data from the server. The transcription data may be generated by a transcription engine as described above and may correspond to time points of content data. The transcription data may include additional information about the location of the transcribed content data and/or audio data with respect to time points in the content data. For example, phrases included in the transcription data may be associated with a time point or range of times points corresponding to the content data. Alternatively, the server may send data separate from the transcription data (e.g., metadata) corresponding to the time points corresponding to the transcription data and content data.

At block 284, computer-executable instructions stored on a memory of a device, such as an electronic device, may be executed to determine that a phrase is a key phrase. Block 284 may be the same as block 208, illustrated in FIG. 2A. At block 285, computer-executable instructions stored on a memory of a device, such as an electronic device, may be executed to determine a sentiment indication, user preferences and/or default settings. Block 285 may be the same as block 209, illustrated in FIG. 2A. At block 286, computer-executable instructions stored on a memory of a device, such as an electronic device, may be executed to determine annotation data associated with the key phrase determined at block 284. Block 286 may be the same as block 210, illustrated in FIG. 2A. At block 287, computer-executable instructions stored on a memory of a device, such as an electronic device, may be executed to determine the presentation parameters for the annotation data associated with a key phrase. Block 287 may be the same as block 211, illustrated in FIG. 2A.

At block 288, computer-executable instructions stored on a memory of a device, such as an electronic device, may be executed to annotate the content data using the annotation data and based on the preferences determined. Annotating the content data may involve rendering the annotation data overlaid on the content data according to the time points associated with the respective annotation data. Further, an annotated content data file may be generated containing both content data and annotation data. The annotated content data file may be run to present the annotated content data on an electronic device.

At optional block 289, computer-executable instructions stored on a memory of a device, such as an electronic device, may be executed to present annotated content data on the electronic device. For example, the annotated content data may be displayed on a display of a mobile phone. The audio and any content that is audio data may be simultaneously played on speakers on the mobile phone.

At decision 290, computer-executable instructions stored on a memory of a device, such as an electronic device, may be executed to determine whether additional phrases should be considered as key phrases. Decision 290 may be the same as decision 214, illustrated in FIG. 2A. If it is determined at decision 290 that additional phrases should be considered, blocks 284-290 may be repeated.

At block 291, computer-executable instructions stored on a memory of a device, such as an electronic device, may be executed to send the annotated content data (e.g., annotated content data file) to a second electronic device (e.g., a second mobile phone). For example, the annotated content data may be sent directly to the second electronic device via a cellular network. Alternatively, the annotated content data may be sent to a server. The server may send the annotated content data to the second electronic device and/or may make the annotated content data available on a data feed that is accessible by the electronic device.

Blocks 281-290 may be repeated each time content data is determined at block 281. In the example where segments of content data are annotated to achieve near real-time annotated content data, blocks 281 to 289 may be repeated for each segment of content data. In the example where the second device receives near real-time annotated content data, each segment of annotated content data may be sent to the second electronic device separately. Alternatively, the annotated content data may be combined in sequence and sent together to the second electronic device and/or server. The combined segments of annotated content data may form a content data session.

Figure 2D:
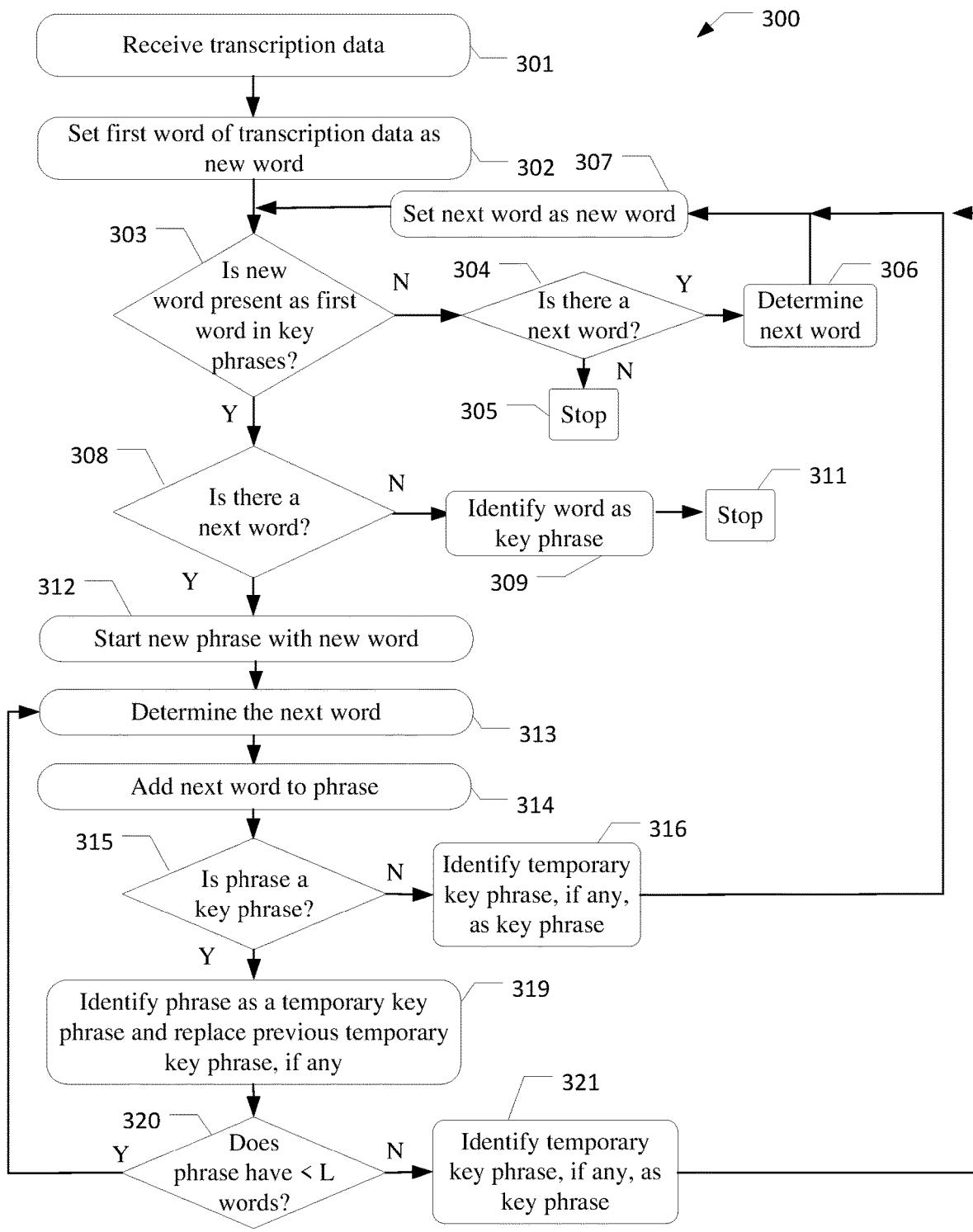
FIG. 2D is schematic illustration of an example process flow for determining a key phrase in accordance with one or more example embodiments of the disclosure.

Referring now to FIG. 2D an example process flow 300 for determining whether key phrases are present transcription data is illustrated. As explained above, a phrase may be one letter, multiple letters in various orders with and/or without spacing(s), one word, more than one word, images (e.g., emoji, gifs, other symbols, etc.), and/or anything else that conveys meaning in the underlying content data. Some or all of the blocks of the process flows in this disclosure may be performed in a distributed manner across any number of devices. Some are all of the operations of the process flow 300 may be optional and may be performed in a different order.

At block 301, computer-executable instructions stored on a memory of a device, such as an electronic device, may be executed to receive transcription data. As explained above, the electronic device may have a transcription engine and may generate transcription data or may receive transcription data from a server running a transcription engine. At block 302, computer-executable instructions stored on a memory of a device, such as an electronic device, may be executed to set the first word in the transcription data as a new word. The first word may chronologically be the first word identified in the transcription data.

At decision 303, computer-executable instructions stored on a memory of a device, such as an electronic device, may be executed to determine if the first word is present as the first word in any key phrases in a library of phrases. For example, if the word is "I", the electronic device may determine that the word is present in the phrase "I love you". If the word is not present as the first word in any key phrases, at decision 304, computer-executable instructions stored on a memory of a device, such as an electronic device, may be executed to determine if there is a next word in the transcription data, such as a next word in chronological order. If there is not a next word, at block 305, computer-executable instructions stored on a memory of a device, such as an electronic device, may be executed to stop the process. If there is a next word, block 306, computer-executable instructions stored on a memory of a device, such as an electronic device, may be executed to determine what that next word is. At block 307, computer-executable instructions stored on a memory of a device, such as an electronic device, may be executed to set the next word as the new word and decision 303 may be initiated once again.

If the word at decision 303 is instead determined to be present as the first word in one or more key phrases, then at decision 308, computer-executable instructions stored on a memory of a device, such as an electronic device, may be executed to determine if there is a next word, chronologically. If there is not a next word, then at block 309, computer-executable instructions stored on a memory of a device, such as an electronic device, may be executed to identify the word as a key phrase and then at block 311, computer-executable instructions stored on a memory of a device, such as an electronic device, may be executed to stop the process.

Alternatively, if there is a next word at decision 308, then at block 312, computer-executable instructions stored on a memory of a device, such as an electronic device, may be executed to start a new phrase with the new word. At block 313, computer-executable instructions stored on a memory of a device, such as an electronic device, may be executed to determine the next word after the new word, chronologically. At block 314, computer-executable instructions stored on a memory of a device, such as an electronic device, may be executed to add the next word to the phrase. For example, the phrase may include the new word plus the word. In one example, the new word may be "I" and the next word may be "love", resulting in the phrase "I love".

At decision 303, computer-executable instructions stored on a memory of a device, such as an electronic device, may be executed to determine if the phrase is a key phrase. For example, the electronic device may determine if the phrase is the same as any phrase entries in the library of phrases. If the phrase is determined at decision 315 not to be a key phrase, computer-executable instructions stored on a memory of a device, such as an electronic device, may be executed to identify any temporary key phrases, if any, as a key phrase, and then computer-executable instructions stored on a memory of a device, such as an electronic device, may be executed to initiate block 307 to set the next word as the new word. Temporary key phrases may be portions of the phrase (e.g., phrase portions) ultimately identified as a key phrase. For example, the phrase "I love" may be a portion of the phrase "I love you" which may be ultimately be identified as a key phrase. Temporary key phrases may also, or alternatively, be identified as key phrases. For example, the phrases "I love" and "I love you" may each be separate entries in the library of phrases. In one example, a user may state, "I love pizza." In this example, the phrase "I love" may first be identified as a temporary phrase because the term "I love" is identified as an entry in the library of phrases. Subsequently, the phrase "I love" may be upgraded from a temporary phrase to a key phrase because the word "love" does not follow "I love" in the statement "I love pizza."

Instead, if the phrase is determined to be a key phrase at decision 315, then at block 319, computer-executable instructions stored on a memory of a device, such as an electronic device, may be executed to identify the phrase as a temporary key phrase and replace any previous temporary key phrase, if any, with new temporary key phrase determined at decision 316. At decision 320, computer-executable instructions stored on a memory of a device, such as an electronic device, may be executed to determine if the phrase has less than "L" words, where L is the maximum number of words in a phrase entry in the library of phrases. For example, if the longest phrase is "I love you too", then L is equal to 4.

If the phrase has more than or equal to L words, then at block 321, computer-executable instructions stored on a memory of a device, such as an electronic device, may be executed to identify any temporary key phrase, if any, as a key phrase, and subsequently block 307 will be initiated. If the phrase instead has fewer than L words, block 313 will be initiated.

Figure 3:
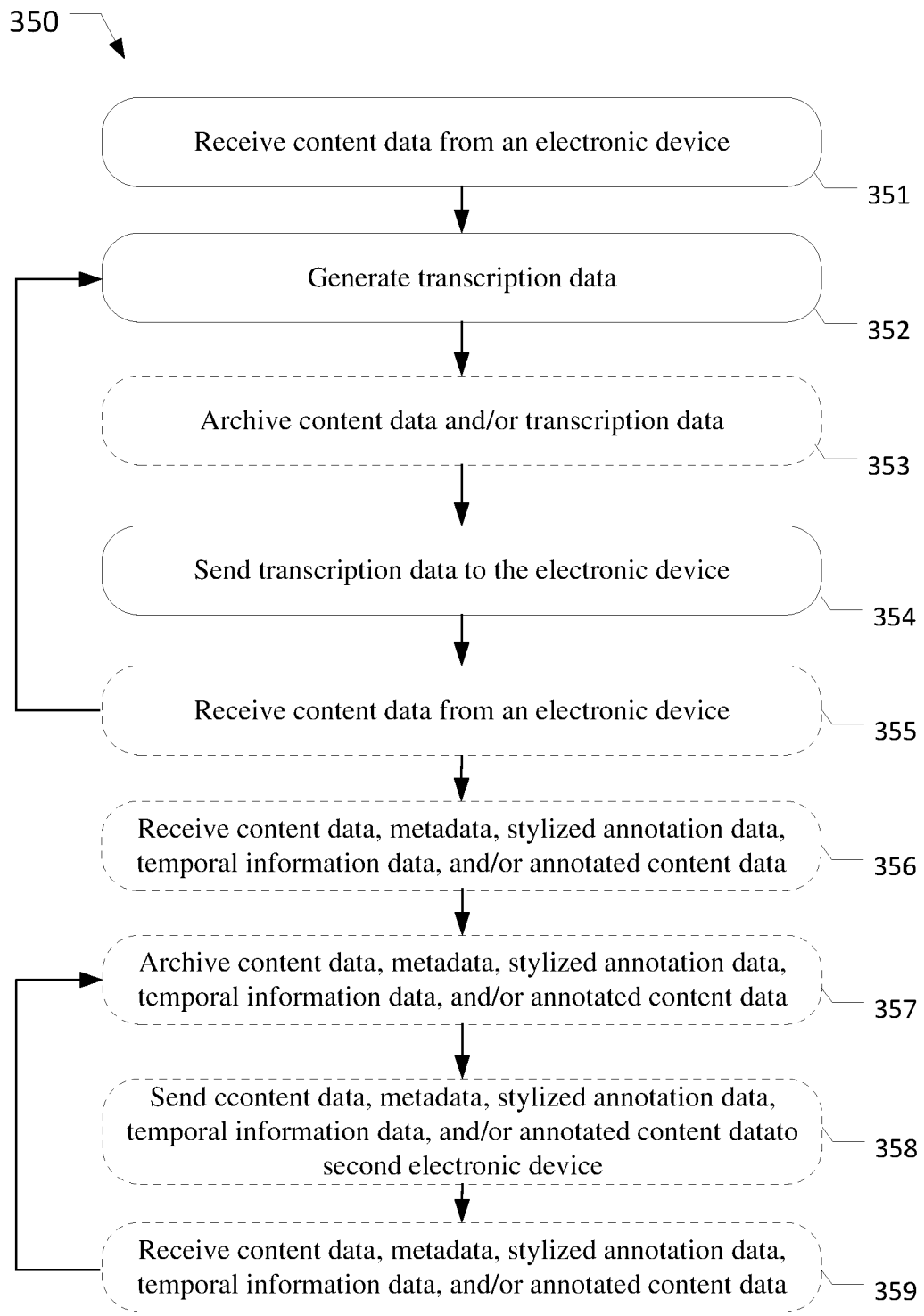
FIG. 3 is a schematic illustration of an example process flow for determining transcription data and receiving content data on a server in accordance with one or more example embodiments of the disclosure.

FIG. 3 depicts an example process flow 350 for receiving content data, generating transcription data based on content data, and receiving annotated content data, metadata, and/or stylized annotation data. Some or all of the blocks of the process flows in this disclosure may be performed in a distributed manner across any number of servers and/or devices. Some or all of the operations of the process flow 300 may be optional and may be performed in a different order.

At block 351, computer-executable instructions stored on a memory of a device, such as a server, may be executed to receive content data from an electronic device. For example, content data may be sent to the server from an electronic device. The content data may have been generated by the electronic device and may include audio data and/or visual data. Alternatively, only audio data may be received by the server.

At block 352, computer-executable instructions stored on a memory of a device, such as a server, may be executed to transcribe content data to generate transcription data. As explained above, the server may employ a transcription engine employing well-known transcription techniques. The server may receive only audio data or both audio data and visual data. Additionally, audio data may need to be separated from the content data at this step to facilitate transcription. The transcription data may include a plurality of phrases. The transcription data may further include temporal information regarding one or more time points of the content data corresponding to the words and/or phrases. Alternatively, the server may generate separate temporal information data indicative of the temporal information.

At optional step 353, computer-executable instructions stored on a memory of a device, such as a server, may be executed to archive or otherwise save the content data, transcription data, and/or temporal information data on the server and/or on a different device. At step 354, computer-executable instructions stored on a memory of a device, such as a server, may be executed to send the transcription data and/or temporal information data to the electronic device. The electronic device may be the same electronic device that sent the server the content data and/or audio data. Alternatively, the electronic device may be a different device than the device that sent the content data and/or audio data to the server.

At optional step 355, computer-executable instructions stored on a memory of a device, such as a server, may be executed to once again receive content data and/or audio data from the electronic device. As explained with respect to block 351, data may be sent to the server from the electronic device and the content data may have been generated by the electronic device and may include audio data and/or visual data. The server may sequentially receive segments of content data for transcription for near real-time content data annotation. After again receiving the content data and/or audio data at block 355, steps 352-354 may be repeated.

At optional step 356, computer-executable instructions stored on a memory of a device, such as a server, may be executed to receive content data, metadata (e.g., indicative of reference time points and/or indicative of annotation data), stylized data, and/or annotated content data. For example, annotated content data may be received from the electronic device and may be generated from the electronic device based on the transcription data sent to the electronic device. The content data, metadata (e.g., indicative of reference time points and/or indicative of annotation data), stylized data, and/or annotated content data may be sent along with instructions to send the annotated content data to a second electronic device. Alternatively, or in addition to, the content data, metadata (e.g., indicative of reference time points and/or indicative of annotation data), stylized data, and/or annotated content data may be sent along with instructions to post the foregoing to a feed and/or to make the foregoing available to one or more devices.

At optional step 357, computer-executable instructions stored on a memory of a device, such as a server, may be executed to archive or otherwise save the content data, metadata (e.g., indicative of reference time points and/or indicative of annotation data), stylized data, and/or annotated content data on the server and/or on a different device. This may further involve archiving the content data, metadata (e.g., indicative of reference time points and/or indicative of annotation data), stylized data, and/or annotated content data. At optional step 358, computer-executable instructions stored on a memory of a device, such as a server, may be executed to send the content data, metadata (e.g., indicative of reference time points and/or indicative of annotation data), stylized data, and/or annotated content data to a second electronic device (e.g., a second mobile phone). For example, the annotated content data received at block 356 may be accompanied by instructions to send the annotated content data to the second electronic device. Alternatively, the second electronic device may request the annotated content data.

At optional step 359, computer-executable instructions stored on a memory of a device, such as a server, may be executed to once again receive content data, metadata (e.g., indicative of reference time points and/or indicative of annotation data), stylized data, and/or annotated content data from the electronic device. As explained above with respect to block 356, content data, metadata (e.g., indicative of reference time points and/or indicative of annotation data), stylized data, and/or annotated content data may be sent to the server from the electronic device. The server may sequentially receive segments of annotated content data and/or content data near real-time viewing of annotated content data. After again receiving the content data, metadata (e.g., indicative of reference time points and/or indicative of annotation data), stylized data, and/or annotated content data at block 359, steps 357-358 may be repeated.

Figure 4:
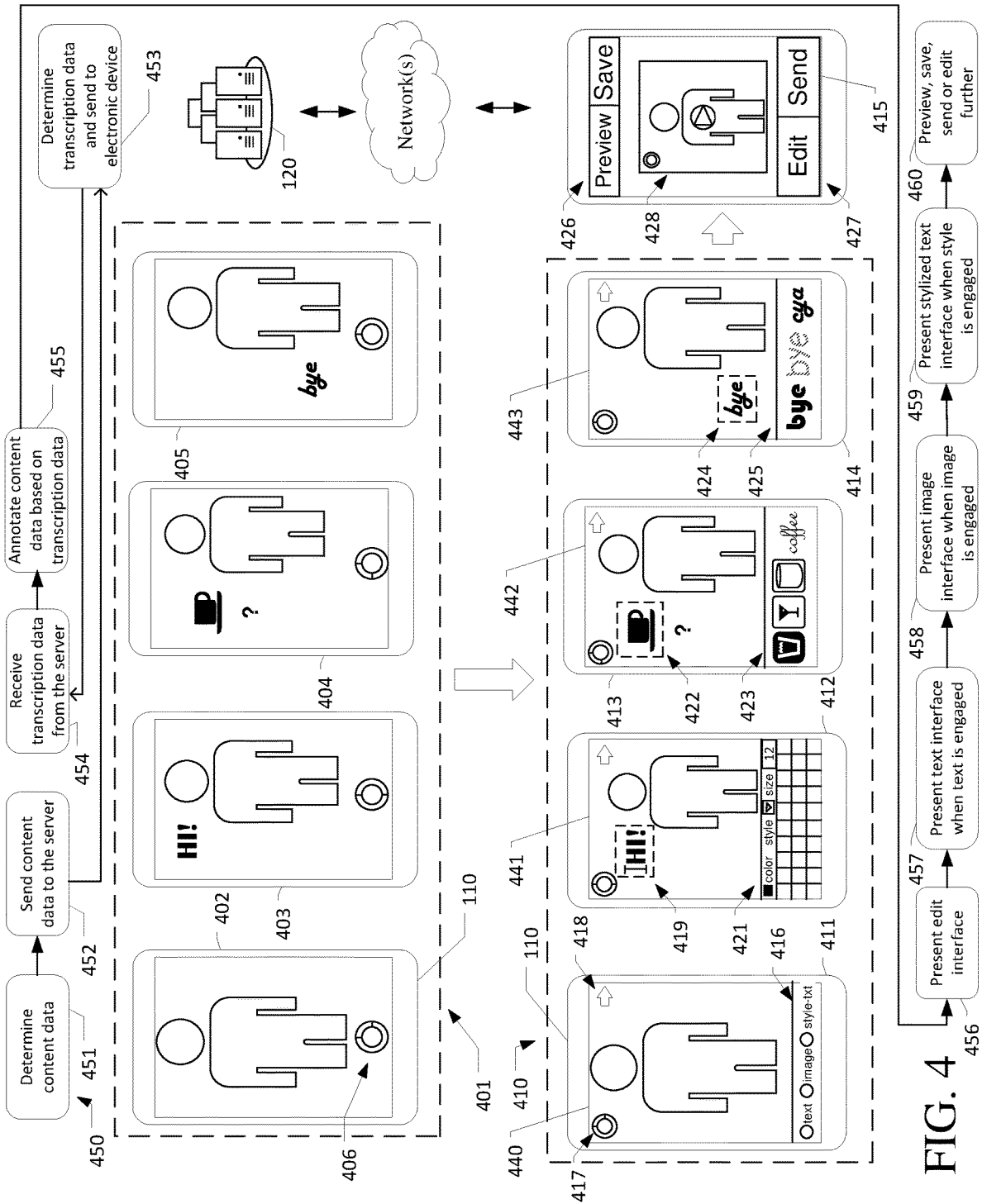
FIG. 4 is a schematic illustration of an example use case for generating annotated content data and editing annotated content data in accordance with one or more example embodiments of the disclosure.

Referring to FIG. 4, an example use case 400 for generating content data, annotating content data and editing the annotated content data is depicted in accordance with one or more example embodiments of the disclosure. In the illustrated example, electronic device 110 may communicate with server 120 and/or electronic device 130 in the same manner described above with respect to FIG. 1D. To initiate the actions of annotating content data and editing the annotated content data, an example process flow 450 is presented and may be performed, for example, by one or more modules on electronic device 110 and/or server 120. The electronic device 110 and/or server 120 may include at least one memory that stores computer-executable instructions and at least one processor configured to access the at least one memory and execute the computer-executable instructions to perform various actions or operations, such as one or more of the operations in the process flow 450 of FIG. 4.

At block 451, content data may be determined. As explained above, this may involve a user using electronic device 110 recording or otherwise capturing video data, audio data, image data and/or any other audio/visual data on electronic device 110. Alternatively, at block 451, electronic may obtain content data from one or more devices, such as a different electronic device or a server. At block 452, the content data determined at block 451 may be sent to server 120 for text transcription. As explained, this may involve sending the content data or only the audio data portion of the content data to server 120 for transcription. In another example, electronic device 110 may include a transcription engine and may generate transcribed text on electronic device 110.

At block 453, the server 120 may receive the content data and/or audio data. The content data and/or audio data may be processed by a transcription engine to determine transcription data indicative of phrases associated with the audio data. The transcription engine may associate the transcription data with time points along the audio data. The electronic device and/or server 120 may separate audio data from content data to facilitate transcription. As explained above, the transcription engine may be any well-known transcription engine. Upon generating transcription data, the transcription data and/or associated temporal information data indicating the time points at which the transcription data corresponds, may be sent from the server 120 to the electronic device 110. At block 454, the transcription data may be received by electronic device 110. The transcription data may include data indicating the time points at which the transcription data corresponds, or that information may be included in temporal information data sent with the transcription data. At block 455, the content data is annotated using the transcription data. The process for annotating the content data based on the transcribed text may be the same as the process set forth with respect to FIG. 1D.

Screen shots 401 illustrate first shot 402, second shot 403, third shot 404, and fourth shot 405, of exemplary annotated content data generated at blocks 451-455. Screen shot 401 may optionally include time indicator 406 which may be the same or similar to time indicator 406. The content data here may include audio data and corresponding transcribed text with the words, "Hey There! Want to get some coffee? Talk soon! Okay, bye." Screen shot 401 may illustrate an automated version of annotated text generated by annotation platform. Based on certain user preferences or default settings, the annotated content data may include no text or content data at first shot 402, may only include the stylized text "HI!" at second shot 43, may only include the coffee image and a question mark at third shot 404, and may include the stylized text, "bye" at fourth shot 405. The disparity between the content data included in screen shots 401 and the content data included in screen shots 140 in FIG. 1D may be due to different preferences settings in a user account profile and/or different default settings regarding the what content data and/or text to use and/or how often.

At block 456, electronic device 110 running the annotation application may receive an input or command to edit the annotated content data (e.g., annotated content data automatically generated by the annotation platform) and may present on the display of the electronic device 110, edit interface 440 for editing the annotated content data. Screen shots 410 illustrate first shot 411, second shot 412, third shot 414, and fourth shot 415, of exemplary edit interface 440. First shot 411 shows a main menu of edit interface 440 and may include time indicator 417 similar to time indicator 406, next button 418 may be used for advancing to the next screen shot or segment of content data, and edit bar 416 may be used for selecting the type of content data (e.g., text, image, sounds, and/or stylized text) to edit. For example, the text button of edit bar 416 may be pressed or engaged (e.g., using a touchscreen) to insert text, the image button may be pressed or engaged to insert an image, and/or the stylized text button may be pressed or engaged to insert a stylized text. Upon engaging any of these buttons, a library of text, images, and/or stylized text may be accessed and searched for selection of annotation data to be added to the media content data. It is understood that edit bar 416 may include several other types of annotation data that may be selected (e.g., sounds).

At block 457, when the text button of edit bar 416 is selected, or when text displayed on annotated content data (e.g., "HI!" on second shot 412) is pressed or otherwise selected, text interface 441 may be engaged. Text interface 441 may similarly include time indicator 417 and next button 418 as well as text selector 421. Text selector 421 may include a keyboard for typing text and buttons for changing color, style (e.g., font), and/or size, for example. In this example, the text 419 may be selected and may be changed to "HELLO!" or "HI THERE!" for example. Using image interface 441, the size and location of the text may be selected and modified.

At block 458, when the image button of edit bar 416 is selected, or when images displayed on annotated content data (e.g., the coffee mug on third shot 413) is pressed or otherwise selected, image interface 442 may be engaged. Image interface 442 may be used to insert and/or edit any type of image and/or visual data (e.g., photos, emoji, animations, videos, memes, etc.). In this example, the coffee mug 422 may be selected (e.g. using a touchscreen), and image interface 442 may be generated. The coffee mug 422 may be replaced with any image populated in image bar 423. Image bar 423 may display other images that are related to the selected image. In this example, image bar 423 may display other images of coffee, cups, or drinks. Image bar 423 may also suggest other types of content data such as stylized text associated with the coffee mug 422. Using image interface 442, the size and location of the content data may be selected and modified.

At block 459, when the stylized text button of edit bar 416 is selected, or when stylized text displayed on annotated content data (e.g., the stylized text "bye" on fourth shot 414)

is pressed or otherwise selected, stylized text interface 443 may be engaged. Stylized text interface 443 may be used to insert and/or edit any type of stylized text and optionally may include a text interface similar to text interface 441 to modify the stylized text. In this example, the stylized text "bye" may be selected (e.g. using a touchscreen), stylized text interface 443 may be generated using the stylized text bar 425. Stylized text bar 425 may display different stylized text options that are related to the stylized text bye 424. For example, different fonts and colors for the text "bye" may be illustrated. Additionally, synonyms and other related words may also be displayed (e.g., "cya"). In some examples, stylized text bar may include other types of related content data (e.g., GIFs, memes, emoji, animations, sounds, etc.). Using stylized text interface 443, the size and location of the content data may be selected and modified.

At block 460, after modifying the annotated content data using edit user interface 440, the modified annotated content data may be displayed on preview interface 415, which may include a preview section 428 for displaying some or all of the modified annotated content data, top bar 426, including options for previewing and/or saving the modified annotated content data, and bottom bar 427 for further editing the annotated content data or sending the modified annotated content data to server 120 and/or electronic device 130 (not shown). If the edit button is selected, edit user interface 440 may be displayed again. The annotated content data may be modified using the edit user interface 440 at one time or in segments that may be sent to server 120 and/or electronic device 130 individually or combined on electronic device 110 and subsequently sent to server 120 and/or electronic device 130.

Figure 5:
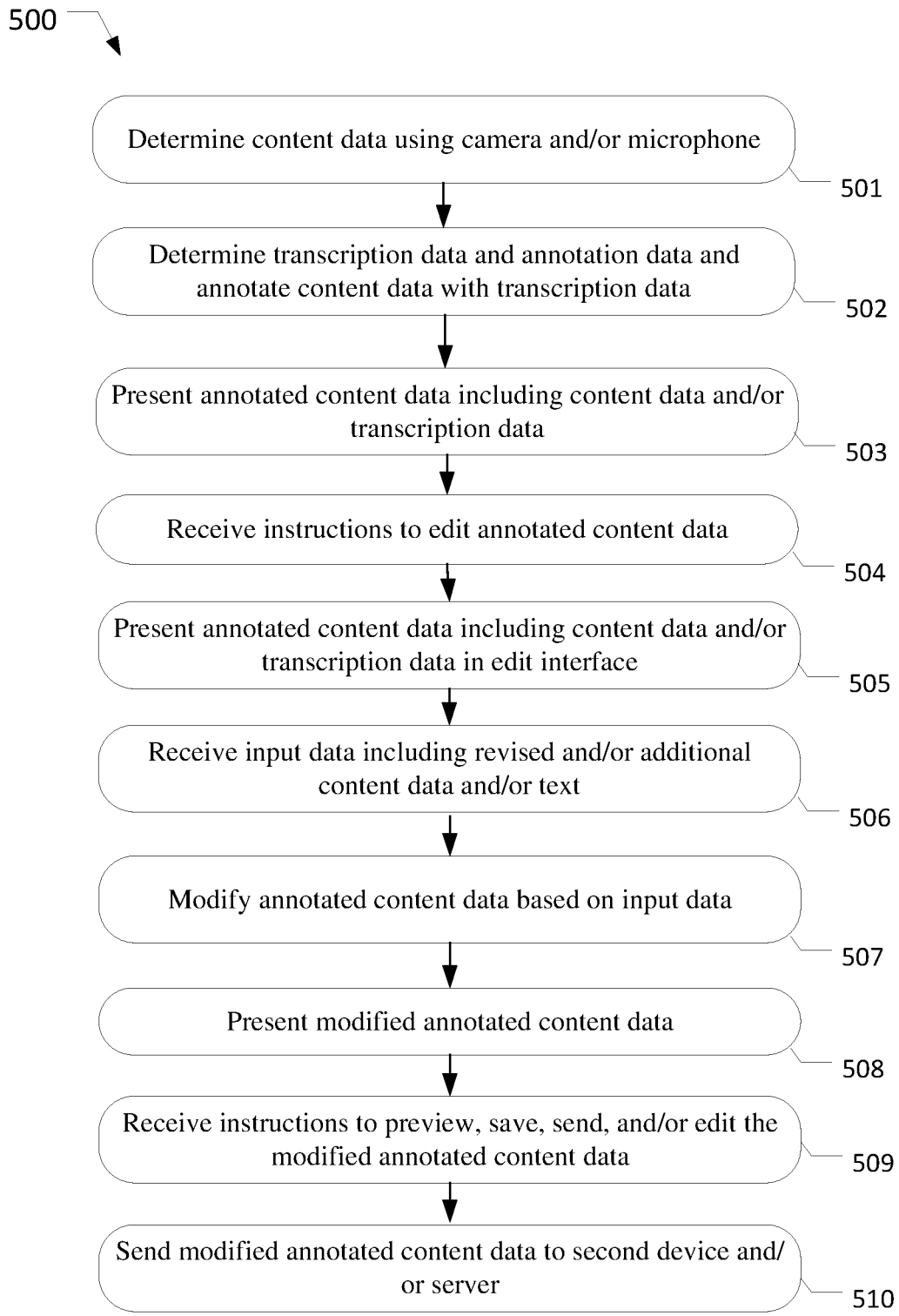
FIG. 5 is a schematic illustration of an example process flow for generating annotated content data and modifying the annotated content data in accordance with one or more example embodiments of the disclosure.

FIG. 5 depicts an example process flow 500 for determining content data including audio data, annotating the content data, and modifying the annotated content data. Some or all of the blocks of the process flows in this disclosure may be performed in a distributed manner across any number of devices. Some are all of the operations of the process flow 500 may be optional and may be performed in a different order.

At block 501, computer-executable instructions stored on a memory of a device, such as an electronic device, may be executed to determine content data such as such as image data, video data, and/or audio data, similar to step 281 of FIG. 2C. At block 502, computer-executable instructions stored on a memory of a device, such as an electronic device, may be executed to determine transcription data and annotation data based on the content data and annotate the content data with content data and text. For example, block 502 may include one or more of the steps described above with respect to blocks 282-286 in FIG. 2C.

At block 503, computer-executable instructions stored on a memory of a device, such as an electronic device, may be executed to present the annotated content data on the electronic device. For example, the annotated content data may be displayed on a display of a mobile phone. The audio data of the content data and any annotation data that is audio data may be simultaneously played on speakers on the electronic device.

At block 504, computer-executable instructions stored on a memory of a device, such as an electronic device, may be executed to receive instructions to edit annotated content data. For example, a user using the electronic device running the annotation application may engage the edit interface of the annotation application to provide input data to edit the annotated content data. In one example, the edit interface may be engaged by selecting annotation data or text (e.g., using a touchscreen).

At block 505, computer-executable instructions stored on a memory of a device, such as an electronic device, may be executed to present the edit user interface on the electronic device. The edit user interface may have the features and functionality described above with respect to FIG. 4. At block 506, computer-executable instructions stored on a memory of a device, such as an electronic device, may be executed to receive input data including revised and/or additional annotation data and/or text. As explained above with respect to edit interface in FIG. 4, a user may interact with the edit interface to add and/or modify annotation data on the annotated content data. This may involve modifying the annotation data and/or text already existing in the annotated content data and/or adding new annotation data and/or text to the annotated content data. At block 507, computer-executable instructions stored on a memory of a device, such as an electronic device, may be executed to modify the annotated content data based on the input data.

At block 508, computer-executable instructions stored on a memory of a device, such as an electronic device, may be executed to present the modified annotated content data. In one example, some or all of modified annotated content data may be presented via a preview interface. The preview interface may further include options and/or buttons for saving the modified annotated content data, further editing the modified annotated content data, and/or sending to the modified annotated content data to a server and/or different electronic device.

At block 509, computer-executable instructions stored on a memory of a device, such as an electronic device, may be executed to receive instructions to preview, save, send, and/or further edit the modifies annotated content data. Based on these instructions, some or all of steps 503-508 may be repeated.

At block 510, computer-executable instructions stored on a memory of a device, such as an electronic device, may be executed to send the annotated content data to a second electronic device (e.g., a second mobile phone). Alternatively, the annotated content data may be sent to server. The server may send the annotated content data to the second electronic device and/or may make the annotated content data available on a data feed that is accessible by the electronic device.

Blocks 502-510 may be repeated each time content data is determined at block 501. In the example where segments of content data are annotated to achieve near real-time modified annotated content data, blocks 501-510 may be repeated for each segment of content data. In the example where the second device receives near real-time annotated content data, each segment of modified annotated content data may be sent to the second electronic device separately. Alternatively, the segments of modified annotated content data may be combined in sequence and sent together to the second electronic device and/or server.

Illustrative Device Architecture

Figure 6:
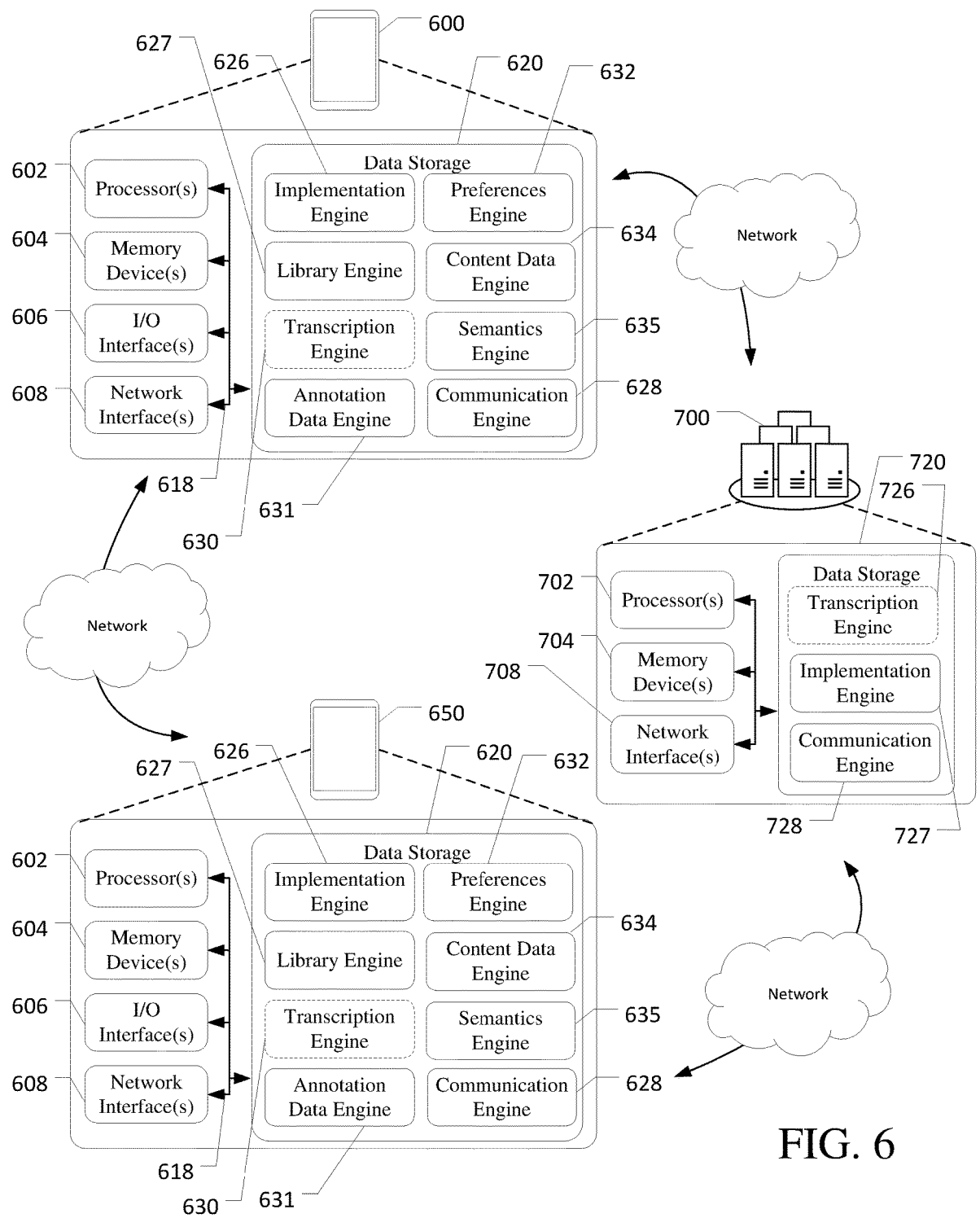
FIG. 6 is a schematic block diagram of a first electronic device, server, and second electronic device in accordance with one or more example embodiments of the disclosure.

FIG. 6 is a schematic block diagram of an illustrative electronic device 600, electronic device 700, and server 700 in accordance with one or more example embodiments of the disclosure. The electronic device 600 and electronic device 650 may include any suitable computing device capable of receiving and/or sending data, and may optionally be coupled to devices including, but not limited to, an electronic device such as a smartphone, tablet, e-reader, mobile device, wearable device, or the like; a connected device; a desktop computer; a laptop computer; one or more servers; or the like. The electronic device 600 may correspond to an illustrative device configuration for electronic device 110 and any other electronic devices of FIGS. 1A-5. The electronic device 650 may correspond to an illustrative device configuration for electronic device 130 and any other electronic devices of FIGS. 1A-5. The server 700 may correspond to an illustrative device configuration for server 120 and any other servers of FIGS. 1A-5. The electronic device 600 may be the same as electronic device 650 and thus may have the same hardware and software components.

The electronic device 600 may be configured to communicate via one or more networks with one or more servers, search engines, user devices, connected device, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device 600 may include one or more processors (processor(s)) 602, one or more memory devices 604 (generically referred to herein as memory 604), one or more input/output (I/O) interface(s) 606, and one or more network interface(s) 608. The electronic device 600 may further include one or more buses 618 that functionally couple various components of the electronic device 600. The electronic device 600 may further include one or more antenna(e) that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHZ antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the electronic device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the electronic device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S); one or more optional database management systems (DBMS); and one or more program module(s), applications, engines, computer-executable code, scripts, or the like such as, for example, one or more implementation engine 626, library engine 627, transcription engine 630, annotation engine 631, preferences engine 632, communication engine 628, semantic engine 635 and/or content data engine 634. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the electronic device 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute computer-executable instructions loaded therein. For example, the processor(s) 602 may be configured to execute computer-executable instructions of the various program module(s), applications, engines, or the like of the electronic device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation engine 626 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, overseeing the distribution of data (e.g., media content data, annotation data, annotated content data, modified annotated content data) between one or more modules, sending signals to electronic devices and other computing devices, servers, datastores and the like, initiating commands locally or at remote devices, and the like.

Library engine 627 may include computer-executable instructions, code, or the like that responsive to execution by one or more of the processor(s) 602 may perform functions including, but not limited to, maintaining a library of phrases (e.g., set of phrases) that are associated with certain annotation data (e.g., images, GIFs, emoji, memes, animations, videos, clips, photos, sounds, etc.). The library engine 627 may coordinate with other modules such as implementation engine 626, preferences engine 632, and annotation data engine 631 to determine and select annotation data to be used to annotate the media content data.

Transcription engine 630 may include computer-executable instructions, code, or the like that responsive to execution by one or more of the processor(s) 602 may perform functions including, but not limited to, transcribing content data and/or audio data to generate transcription data. Transcription engine 630 be any well-known text transcription and/or speech processing engine designed to receive audio and/or content data as an input and determine transcription data, such as transcribed text, associated with the audio and/or content data. The transcription data may be text or may be a numerical or other computer representation of text. The transcription data may correspond to one or more time points associated with the audio and/or content data. In one example, the transcription engine may employ automatic speech recognition (ASR) software. In another example, transcription engine 630 may employ natural-language understanding (NLU) and/or natural-language interpretation (NLI). It is understood that transcription engine 630 may be optional.

Annotation data engine 631 may include computer-executable instructions, code, or the like that responsive to execution by one or more of the processor(s) 602 may perform functions including, but not limited to, maintaining a catalogue of annotation data (e.g., images, GIFs, emoji, memes, animations, videos, clips, photos, sounds, etc.) that corresponds to the annotation data identified in the library of phrases associated with annotation data maintained by library engine 627.

Preferences engine 632 may include computer-executable instructions, code, or the like that responsive to execution by one or more of the processor(s) 602 may perform functions including, but not limited to, maintaining a user account profile including preferences saved to that user account. The preferences may include preferences for how much text to include in the content data, how much annotation data to include in the content data, favorite types of annotation data (e.g., emoji vs. GIFs vs. animations, for example), favorite annotation data (e.g., favorite emoji and/or sounds), preferred text style and/or color, and/or preferred presentation of annotation data, for example. Preferences engine 632 may optionally monitor selections made corresponding to a user account and make future decisions about content data based on past selections (e.g., using artificial intelligence). For example, if a user associated with user account has selected pink font in the past, pink font may be selected as the default font for that user account.

Semantics engine 635 may include computer-executable instructions, code, or the like that responsive to execution by one or more of the processor(s) 602 may perform functions including, but not limited to, determine a sentiment indication associated with the content data. The sentiment indication may be indicative of the emotion or sentiment associated with content data. The semantics engine may determine a sentiment indication as described above with respect to FIG. 1B. The analyzed sentiment variables may be separated into and/or identified as emotional components and style components and from the analyzed sentiment variables, the sentiment indication may be determined.

The communication engine 628 may include computer-executable instructions, code, or the like that responsive to execution by one or more of the processor(s) 602 may perform functions including, but not limited to, communicating with one or more devices, for example, via wired or wireless communication, communicating with user devices, communicating with servers (e.g., remote servers), communicating with other devices such as other electronic devices, sending or receiving messages, information and/or data (e.g., content data, audio data, annotated content data, and/or modified annotated content data), sending or receiving notifications and/or commands/directives, communicating with cache memory data, and the like.

Content data engine 634, may include computer-executable instructions, code, or the like that responsive to execution by one or more of the processor(s) 602 may perform functions including, but not limited to, overseeing the generating and otherwise obtaining content data including audio data and/or visual data, overseeing the generating and/or obtaining input data and/or transcribed text, facilitating and otherwise implementing the annotations of media with input data, content data, and/or transcribed text.

Referring now to other illustrative components depicted as being stored in the data storage 620, the O/S may be loaded from the data storage 620 into the memory 604 and may provide an interface between other application software executing on the electronic device 600 and hardware resources of the electronic device 600. More specifically, the O/S may include a set of computer-executable instructions for managing hardware resources of the electronic device 600 and for providing common services to other application programs (e.g., managing memory allocation among various application programs). In certain example embodiments, the O/S may control execution of the other program module(s) to for content rendering. The O/S may include any operating system now known or which may be developed in the future including, but not limited to, any server operating system, any mainframe operating system, or any other proprietary or non-proprietary operating system.

The DBMS may be loaded into the memory 604 and may support functionality for accessing, retrieving, storing, and/or manipulating data stored in the memory 604 and/or data stored in the data storage 620. The DBMS may use any of a variety of database models (e.g., relational model, object model, etc.) and may support any of a variety of query languages. The DBMS may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device 600 is a mobile electronic device, the DBMS may be any suitable light-weight DBMS optimized for performance on a mobile device.

Referring now to other illustrative components of the electronic device 600, the optional input/output (I/O) interface(s) 606 may facilitate the receipt of input information by the electronic device 600 from one or more I/O devices as well as the output of information from the electronic device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The electronic device 600 may further include one or more network interface(s) 608 via which the electronic device 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) may include any suitable type of antenna depending, for example, on the communications protocols used to transmit or receive signals via the antenna (c). Non-limiting examples of suitable antennas may include directional antennas, non-directional antennas, dipole antennas, folded dipole antennas, patch antennas, multiple-input multiple-output (MIMO) antennas, or the like. The antenna (e) may be communicatively coupled to one or more transceivers 612 or radio components to which or from which signals may be transmitted or received.

The antenna(e) may include a cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) may additionally, or alternatively, include a Wi-Fi antenna configured to transmit or receive signals in accordance with established standards and protocols, such as the IEEE 802.11 family of standards, including via 2.4 GHZ channels (e.g., 802.11b, 802.11g, 802.11n), 5 GHz channels (e.g., 802.11n, 802.11ac), or 60 GHz channels (e.g., 802.11ad). In alternative example embodiments, the antenna(e) may be configured to transmit or receive radio frequency signals within any suitable frequency range forming part of the unlicensed portion of the radio spectrum (e.g., 900 MHZ). In yet another alternative example, the antenna (e) may include a Bluetooth antenna configured to transmit or receive signals in accordance with established standards and protocols, such as Bluetooth and/or BLE The antenna(e) may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The server 700 may be one or more servers and may include any suitable computing device capable of receiving and/or sending data, and may optionally be coupled to devices including, but not limited to, electronic devices such as a smartphone, tablet, e-reader, wearable device, or the like; a connected device; a desktop computer; a laptop computer; one or more servers; datastores; or the like.

The server 700 may be configured to communicate via one or more networks with one or more servers, search engines, user devices, electronic devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the sever 700 may include one or more processors (processor(s)) 702, one or more memory devices 704 (generically referred to herein as memory 704), and one or more network interface(s) 708, as well as and one or more antenna(s). The server 700 may further include one or more buses 718 that functionally couple various components of the server 700. These various components will be described in more detail hereinafter.

The sever 700 may further include one or more antenna(e) that may have the same or substantially the same features, operation, and/or functionality as described above with respect to electronic device 600. The bus(es) 718 may have the same or substantially the same features, operation, and/or functionality as described above with respect to bus(es) 618. The memory 704 may have the same or substantially the same features, operation, and/or functionality as described above with respect to memory 604.

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S); one or more optional database management systems (DBMS); and one or more program module(s), applications, engines, computer-executable code, scripts, or the like such as, for example, one or more transcription engine 726, one or more communication engine 728, and one or more implementation engine 727. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the server device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. The datastore(s) may include, for example, user preference information, user contact data, device pairing information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) of server 700, the transcription engine 726 may include computer-executable instructions, code, or the like that responsive to execution by one or more of the processor(s) 702 may perform functions including, but not limited to, transcribing content data and/or audio data to generate transcription data. Transcription engine 726 be any well-known text transcription and/or speech processing engine designed to receive audio and/or content data as an input and determine transcription data, such as transcribed text, associated with the audio and/or content data. The transcription data may be text or may be a numerical or other computer representation of text. The transcription data may correspond to one or more time points associated with the audio and/or content data. In one example, the transcription engine may employ automatic speech recognition (ASR) software. In another example, transcription engine 726 may employ natural-language understanding (NLU) and/or natural-language interpretation (NLI). It is understood that transcription engine 630 may be optional.

The communication engine 728 may include computer-executable instructions, code, or the like that responsive to execution by one or more of the processor(s) 702 may perform functions including, but not limited to, communicating with one or more electronic devices, for example, via wired or wireless communication, user devices, mobile devices, communicating with servers (e.g., remote servers), communicating with remote datastores and/or databases, sending or receiving notifications or commands/directives, communicating with cache memory data, and the like.

The implementation engine 727 may include computer-executable instructions, code, or the like that responsive to execution by one or more of the processor(s) 702 may perform functions including, but not limited to, overseeing coordination and interaction between modules and computer executable instructions in data storage 720, determining user selected actions and tasks, determining actions associated with user interactions, determining actions associated with instructions received from electronic devices, determining actions associated with a user account, sending signals to electronic devices, other computing devices, servers, datastores and the like, initiating commands locally or at electronic devices, and the like.

Referring now to other illustrative components depicted as being stored in the data storage 720, the O/S may be loaded from the data storage 720 into the memory 704 and may provide an interface between other application software executing on the server 700 and hardware resources of the server 700. More specifically, the O/S may include a set of computer-executable instructions for managing hardware resources of the server 700 and for providing common services to other application programs (e.g., managing memory allocation among various application programs). In certain example embodiments, the O/S may control execution of the other program module(s) to for content rendering. The O/S may include any operating system now known or which may be developed in the future including, but not limited to, any server operating system, any mainframe operating system, or any other proprietary or non-proprietary operating system.

The DBMS may be loaded into the memory 704 and may support functionality for accessing, retrieving, storing, and/or manipulating data stored in the memory 704 and/or data stored in the data storage 720. The DBMS may use any of a variety of database models (e.g., relational model, object model, etc.) and may support any of a variety of query languages. The DBMS may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

The server 700 may further include one or more network interface(s) 708 via which the server 700 may communicate with any of a variety of other systems, platforms, networks, devices, and so forth. The network interface(s) 708 may enable communication, for example, with one or more electronic devices, connected devices, mobile devices, one or more wireless routers, one or more host servers, one or more web servers, and the like via one or more of networks.

It should be appreciated that the program module(s), applications, computer-executable instructions, code, or the like depicted in FIG. 6 as being stored in the data storage 620, or as being stored in the data storage 720, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device 600, server 700 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device 600 and/or server 700 may include alternate and/or additional hardware, software, or firmware components beyond those described or depicted without departing from the scope of the disclosure. More particularly, it should be appreciated that software, firmware, or hardware components depicted as forming part of the electronic device 600 and/or server 700 are merely illustrative and that some components may not be present or additional components may be provided in various embodiments. While various illustrative program module(s) have been depicted and described as software module(s) stored in data storage 620 and/or data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s)

of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by a first device, content data comprising audio data;
   generating first data indicative of a phrase represented by the audio data, the first data associated with a first portion of the content data;
   associating the first data with timing data representing a time-based reference with respect to the content data;
   determining a first phrase portion as a key phrase, the first phrase portion having a first number of words, and corresponds to a first entry in a set of phrases;
   determining a second phrase portion, the second phrase portion including the first phrase portion and having a second number of words, and corresponding to a second entry in a set of phrases, wherein the second number of words is more than the first number of words;

replacing the first phrase portion with the second phrase portion as the key phrase;

determining a third phrase portion, the third phrase portion including the second phrase portion and having a third number of words than is more than the second number of words;

determining the third phrase portion fails to have a corresponding entry in the set of phrases;

determining a sentiment indication based on the key phrase and corresponding to the first portion of content data;

determining second data based at least in part on the sentiment indication, the second data representing second content associated with at least a portion of the phrase;

determining parameter data associated with presentation of the second data with the content data, wherein the parameter data includes a presentation location and style of the second data;

determining fourth data indicative of third content associated with the phrase, wherein the fourth data includes a plurality of images;

determining user input indicative of a selection of an image from the plurality of images;

determining fifth data indicative of the image for presentation with the second data;

generating metadata associated with the content data, the metadata indicating a time reference point in timing data when the fifth data is to be rendered and the parameter data;

presenting, at the first device, a preview interface based on the content data, metadata, second data and fifth data;

receiving at the preview interface user input indicative of a request to send the content data, metadata, second data and fifth data to a second device; and sending the content data, metadata, second data and fifth data to the second device.

2. The method of claim 1, further comprising:
determining that audio data corresponds to a voice profile;
determining a vector based on audio data, the vector indicative of audio levels of the audio data; and
determining a score by applying the vector to a first neural network trained using acoustic and lexical features, wherein the score corresponds to a sentiment indication.

3. The method of claim 1, wherein determining second data comprises determining the phrase corresponds to the second entry in the set of phrases, wherein the second data is associated with the second entry.

4. The method of claim 1, further comprising:
determining that the sentiment indication corresponds to a happy disposition; and
selecting the set of phrases from two or more sets of phrases based on the sentiment indication corresponding to the happy disposition.

5. The method of claim 1, further comprising determining, prior to determining the third phrase portion, the second phrase portion is a number of words less than a maximum number of words of an entry in the set of phrases.

6. The method of claim 1, further comprising:
determining that the sentiment indication corresponds to an excited disposition; and enlarging a size of the second data with respect to the content data based on the sentiment indication corresponding to the excited disposition.

7. The method of claim 1, further comprising determining the plurality of images, and presenting the plurality of images in a selectable format at the first device.

8. The method of claim 1, wherein the plurality of images includes stylized text associated with the second content.

9. The method of claim 1, wherein the portion of the second data replaced by the fifth data includes a word of the key phrase.

10. A system comprising:
memory configured to store computer-executable instructions, and
at least one computer processor configured to access memory and execute the computer-executable instructions to:
receive content data comprising audio data;
generate first data indicative of a phrase represented by the audio data, the first data associated with a first portion of the content data;
associate the first data with timing data representing a time-based reference with respect to the content data;
determine a first phrase portion as a key phrase, the first phrase portion having a first number of words present in the phrase, and corresponds to a first entry in a set of phrases;
determine a second phrase portion, the second phrase portion including the first phrase portion and having a second number of words present in the phrase, and corresponds to a second entry in a set of phrases, wherein the second number of words is more than the first number of words;
replace the first phrase portion with the second phrase portion as the key phrase based on the second phrase portion having more words than the first phrase portion;
determine a third phrase portion, the third phrase portion including the second phrase portion and having a third number of words that than is more than the second number of words;
determine the third phrase portion fails to have a corresponding entry in the set of phrases;
determine a sentiment indication based on the key phrase and corresponding to the first portion of the content data;
determine second data based at least in part on the sentiment indication, the second data representing second content associated with at least a portion of the phrase;
determine parameter data associated with presentation of the second data with the content data, wherein the parameter data includes a presentation location and style of the second data;
determine fourth data indicative of third content associated with the phrase, wherein the fourth data includes a plurality of images;
determine user input indicative of a selection of an image from the plurality of images;
determine fifth data indicative of the image for presentation with the second data;
generate metadata associated with the content data, the metadata indicating a time reference point in timing data when the fifth data is to be rendered and the parameter data;

present, at the first device, a preview interface based on the content data, metadata, second data and fifth data;

receive at the preview interface user input indicative of a request to send the content data, metadata, second data and fifth data to a second device; and send the content data, metadata, second data and fifth data to the second device.

11. The system of claim 10, wherein the at least one computer processor is further configured to access memory and execute the computer-executable instructions to:

determine that audio data corresponds to a voice profile;

determine a vector based on the audio data, the vector indicative of audio levels of the audio data; and determine a score by applying the vector to a first neural network trained using acoustic and lexical features, wherein the score corresponds to a sentiment indication.

12. The system of claim 10, wherein determining second data comprises determining the second phrase portion corresponds to the second entry in the set of phrases, wherein the second data is associated with the second entry.

13. The system of claim 12, wherein the at least one computer processor is further configured to access memory and execute the computer-executable instructions to:

determine that the sentiment indication corresponds to a happy disposition; and select the set of phrases from two or more sets of phrases based on the sentiment indication corresponding to the happy disposition.

14. The system of claim 10, wherein the at least one computer processor is further configured to access memory and execute the computer-executable instructions to:

determine, prior to determining the third phrase portion, the second number of words less than a maximum number of words of an entry in the set of phrases.

15. The system of claim 10, wherein the at least one computer processor is further configured to access memory and execute the computer-executable instructions to:

determine that the sentiment indication corresponds to an excited disposition; and determine a size of the second data with respect to the content data based on the sentiment indication corresponding to the excited disposition.

16. The system of claim 10, wherein the at least one computer processor is further configured to access memory and execute the computer-executable instructions to:

determine the plurality of images; and present the plurality of images in a selectable format.

17. The system of claim 10, wherein the plurality of images includes stylized text associated with the second content.

18. The system of claim 10, wherein the portion of the second data replaced by the fifth data includes a word of the key phrase.

* * * * *